United States Patent
Su

(10) Patent No.: US 10,958,427 B2
(45) Date of Patent: Mar. 23, 2021

(54) ORIGINAL KEY RECOVERY APPARATUS AND METHOD

(71) Applicant: Huawei Technologies Co., Ltd., Shenzhen (CN)

(72) Inventor: Changzheng Su, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 297 days.

(21) Appl. No.: 16/116,171

(22) Filed: Aug. 29, 2018

(65) Prior Publication Data

US 2018/0367301 A1  Dec. 20, 2018

Related U.S. Application Data

(63) Continuation of application No. PCT/CN2016/100181, filed on Sep. 26, 2016.

(30) Foreign Application Priority Data

Feb. 29, 2016  (CN) .......................... 201610115768.2

(51) Int. Cl.
*H04L 9/08* (2006.01)
*H04B 10/532* (2013.01)
(Continued)

(52) U.S. Cl.
CPC ......... *H04L 9/0852* (2013.01); *H04B 10/532* (2013.01); *H04B 10/614* (2013.01);
(Continued)

(58) Field of Classification Search
CPC .. H04B 10/532; H04B 10/614; H04B 10/802; H04J 14/06; H04L 9/0852
See application file for complete search history.

(56) References Cited

U.S. PATENT DOCUMENTS 7,936,999 B1   5/2011  Hawryluck et al.
2005/0281561 A1  12/2005  Tomaru
(Continued)

FOREIGN PATENT DOCUMENTS

CN   101540760 A   9/2009
CN   102724036 A   10/2012
(Continued)

OTHER PUBLICATIONS

Huang, D. et al., "High-speed Continuous-Variable Quantum Key Distribution Without Sending a Local Oscillator," Optics Letters, vol. 40, No. 16 , Aug. 15, 2015, pp. 3695-3698.
(Continued)

*Primary Examiner* — Christopher C Harris
(74) *Attorney, Agent, or Firm* — Slater Matsil, LLP

(57) ABSTRACT

In the embodiments of the present invention, a transmit optical signal includes a reference optical signal and a quantum optical signal, optical splitting processing and coherent coupling are performed on the transmit optical signal by using a local oscillator optical signal to obtain at least two coherently coupled optical signals, and then optical-to-electrical conversion and amplification are separately performed on a first coherently coupled optical signal that includes the reference optical signal and a second coherently coupled optical signal that includes the quantum optical signal, to obtain a first electrical signal and a second electrical signal. Then, phase frequency information between the local oscillator optical signal and the reference optical signal is obtained from the first electrical signal, and an original key is recovered from the second electrical signal based on the phase frequency information.

19 Claims, 18 Drawing Sheets

(51) Int. Cl.
*H04B 10/61* (2013.01)
*H04B 10/80* (2013.01)
*H04J 14/06* (2006.01)

(52) U.S. Cl.
CPC ............ *H04B 10/802* (2013.01); *H04J 14/06* (2013.01); *H04L 9/0858* (2013.01); *H04L 9/0894* (2013.01)

(56) References Cited

U.S. PATENT DOCUMENTS

| | | | |
|---|---|---|---|
| 2006/0153573 | A1 | 7/2006 | Tomaru |
| 2007/0058810 | A1* | 3/2007 | Tanaka .................. H04L 9/0852 380/210 |
| 2009/0022322 | A1* | 1/2009 | Trifonov ................ H04B 10/70 380/278 |
| 2009/0074192 | A1 | 3/2009 | Beal et al. |
| 2011/0170690 | A1 | 7/2011 | Shpantzer |
| 2012/0177374 | A1 | 7/2012 | Yuan et al. |
| 2015/0036824 | A1 | 2/2015 | Dixon et al. |
| 2015/0249537 | A1 | 9/2015 | Wabnig et al. |

FOREIGN PATENT DOCUMENTS

| | | |
|---|---|---|
| CN | 102868520 A | 1/2013 |
| CN | 102916807 A | 2/2013 |
| CN | 104737491 A | 6/2015 |
| CN | 105024809 A | 11/2015 |
| JP | 2006013573 A | 1/2006 |
| JP | 2006191410 A | 7/2006 |
| JP | 2008306474 A | 12/2008 |
| JP | 2011109302 A | 6/2011 |
| WO | 2005046114 A2 | 5/2005 |
| WO | 2013057967 A1 | 4/2013 |
| WO | 2014115118 A2 | 7/2014 |

OTHER PUBLICATIONS

Jouguet, P. et al., "Experimental Demonstration of Long-Distance Continuous-Variable Quantum Key Distribution," arXiv:1210.6216v1 [quant-ph] Oct. 23, 2012, pp. 1-6.

Qi, B. et al., "Generating the Local Oscillator 'Locally' in Continuous-Variable Quantum Key Distribution Based on Coherent Detection," arXiv:1503.00662v3 [quant-ph] Jun. 19, 2015, pp. 1-11.

Soh, D.B.S. et al., "Self-Referenced Continuous-Variable Quantum Key Distribution Protocol," arXiv:1503.04763v2 [quant-ph] Oct. 29, 2015, pp. 1-14.

\* cited by examiner

Note: TIA: trans-impedance amplifier

ORIGINAL KEY RECOVERY APPARATUS AND METHOD

CROSS-REFERENCE TO RELATED APPLICATIONS

This application is a continuation of International Application No. PCT/CN2016/100181, filed on Sep. 26, 2016, which claims priority to Chinese Patent Application No. 201610115768.2, filed on Feb. 29, 2016. The disclosures of the aforementioned applications are hereby incorporated by reference in their entireties.

TECHNICAL FIELD

Embodiments of the present invention relate to the field of quantum communication, and in particular, to an original key recovery apparatus and method.

BACKGROUND

With rapid development of network technologies, a large amount of sensitive information needs to be transmitted through a network, and people need to protect the sensitive information from being lost or attacked. Encryption is an important means to ensure information security. An existing classical encryption system is established based on computational complexity, and may be deciphered. In a classical cryptosystem, only a one-time key can be used to achieve unconditional security, but how to generate a large quantity of random number keys is always a problem. A quantum key distribution (QKD) technology resolves this problem.

Specifically, in QKD, a quantum state is used as an information unit, and some principles of quantum mechanics are used to transmit and protect information. Usually, two communication parties establish a shared key between the two secure communication parties through quantum channel transmission by using the quantum state as an information carrier and using a quantum mechanics principle. Security of the QKD is ensured using quantum properties, such as "Heisenberg's uncertainty relationship" and "single-quantum no-cloning theorem" in quantum mechanics, or coherence and nonlocality of entangled particles.

FIG. 1a shows an example of a schematic structural diagram of a system to which quantum communication is applied. As shown in FIG. 1a, the system includes a sending apparatus 101 and a receiving apparatus 102. The sending apparatus includes a master control unit 103, a quantum transmitter 104, a synchronization clock transmitter 105, a negotiation information transceiver 106, and a service information transmitter 107. The receiving apparatus includes a master control unit 108, a quantum receiver 109, a synchronization clock receiver 110, a negotiation information transceiver 111, and a service information receiver 112. The sending apparatus sends, using the quantum transmitter to the quantum receiver of the receiving apparatus, a quantum optical signal that carries an original key, so that the receiving apparatus recovers an original quantum key from the quantum optical signal. The sending apparatus sends a synchronization clock signal to the synchronization clock receiver of the receiving apparatus using the synchronization clock transmitter, so that the receiving apparatus implements clock synchronization with the sending apparatus. Negotiation information is sent and received between the negotiation information transceiver of the sending apparatus and the negotiation information transceiver of the receiving apparatus, so that the sending apparatus and the receiving apparatus determine a final quantum key from the original quantum key based on the negotiation information. The sending apparatus sends service information to the service information receiver of the receiving apparatus using the service information transmitter.

A quantum key distribution process includes the following. A sending apparatus adds an original key to a quantum optical signal and sends the quantum optical signal to a receiving apparatus. After receiving the quantum optical signal, the receiving apparatus recovers the original key from the quantum optical signal. Further, a key that is finally used is determined from the original key through negotiation between the sending apparatus and the receiving apparatus.

In a current system, a sending apparatus generates a local oscillator optical signal, and transmits the local oscillator optical signal and a quantum optical signal through a same optical fiber. In this case, if a receiving apparatus needs to accurately recover an original key, a time at which the local oscillator optical signal and the quantum optical signal arrive at an input end of a 2:2 coupler needs to be strictly ensured. To be specific, the receiving apparatus needs to perform strict equal-length control on paths through which the local oscillator optical signal and the quantum optical signal pass. This technical solution is very difficult to use in engineering.

To sum up, an original key recovery apparatus and method are urgently needed to recover an original key from a received quantum optical signal more simply and accurately.

SUMMARY

Embodiments of the present invention provide an original key recovery apparatus and method, to recover an original key from a received quantum optical signal more simply and accurately.

Embodiments of the present invention provide an original key recovery apparatus, including a coherent coupling unit, a reference optical balanced detection unit and a quantum optical balanced detection unit that are connected to the coherent coupling unit, a carrier recovery unit connected to the reference optical balanced detection unit, and a key recovery unit connected to the quantum optical balanced detection unit, where the carrier recovery unit is connected to the key recovery unit. The coherent coupling unit is configured to perform optical splitting processing and coherent coupling on a received transmit optical signal based on a local oscillator optical signal to obtain at least two coherently coupled optical signals, where the transmit optical signal includes a reference optical signal and a quantum optical signal, the at least two coherently coupled optical signals include at least one first coherently coupled optical signal and at least one second coherently coupled optical signal, each first coherently coupled optical signal includes at least the reference optical signal, and each second coherently coupled optical signal includes at least the quantum optical signal. The reference optical balanced detection unit is configured to: perform optical-to-electrical conversion and amplification on the at least one first coherently coupled optical signal to obtain at least one first electrical signal, and transmit the at least one first electrical signal to the carrier recovery unit. The quantum optical balanced detection unit is configured to: perform optical-to-electrical conversion and amplification on the at least one second coherently coupled optical signal to obtain at least one second electrical signal, and transmit the at least one second electrical signal to the key recovery unit. The carrier recovery unit is configured to: determine, from the at least one first electrical signal, phase frequency information between the local oscillator optical signal and the reference optical signal, and send the phase frequency information to the key recovery unit. The key recovery unit is configured to recover an original key from the at least one second electrical signal based on the received phase frequency information.

An embodiment of the present invention provides an original key recovery method. The method includes performing optical splitting processing and coherent coupling on a received transmit optical signal based on a local oscillator optical signal to obtain at least two coherently coupled optical signals, where the transmit optical signal includes a reference optical signal and a quantum optical signal, the at least two coherently coupled optical signals include at least one first coherently coupled optical signal and at least one second coherently coupled optical signal, each first coherently coupled optical signal includes at least the reference optical signal, and each second coherently coupled optical signal includes at least the quantum optical signal. The method also includes performing optical-to-electrical conversion and amplification on the at least one first coherently coupled optical signal to obtain at least one first electrical signal, and performing optical-to-electrical conversion and amplification on the at least one second coherently coupled optical signal to obtain at least one second electrical signal. The method also includes determining, from the at least one first electrical signal, phase frequency information between the local oscillator optical signal and the reference optical signal, and recovering an original key from the at least one second electrical signal based on the received phase frequency information.

BRIEF DESCRIPTION OF THE DRAWINGS

To describe the technical solutions in the embodiments of the present invention more clearly, the following briefly describes the accompanying drawings required for describing the embodiments.

FIG. 5g-1 and FIG. 5g-2 are a schematic structural diagram of a still yet further original key recovery apparatus according to an embodiment of the present invention.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

In an embodiment of the present invention, an original key recovery apparatus is included in a receiving apparatus, and is configured to recover, on a receiving apparatus side, an original key from a received quantum optical signal by using a more simple and accurate method. The original key recovery apparatus includes but is not limited to a base station, a station controller, an access point (AP), or any other type of interface apparatus that can operate in a wireless environment.

Figure 1A:
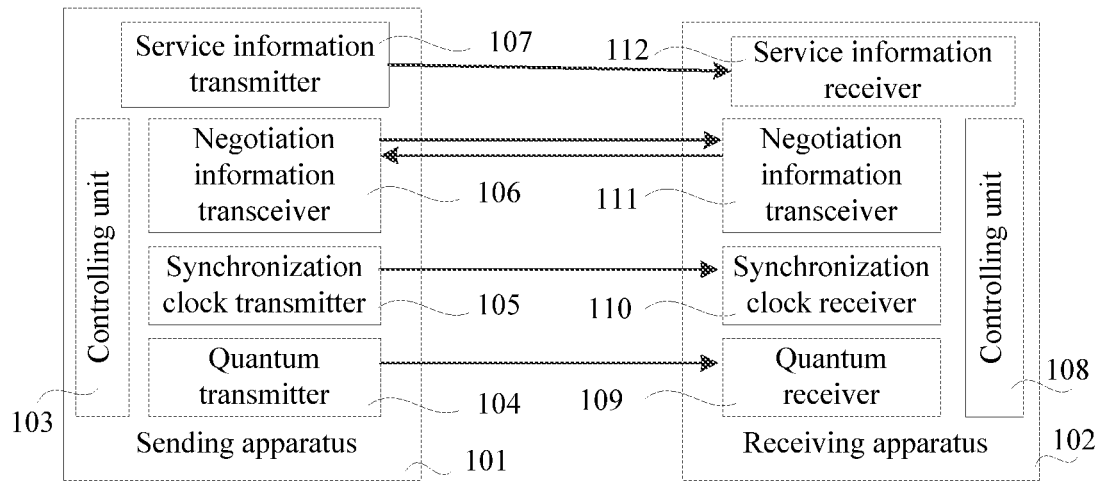
FIG. 1a is a schematic structural diagram of a system to which quantum communication is applied according to a current system.
Figure 2A:
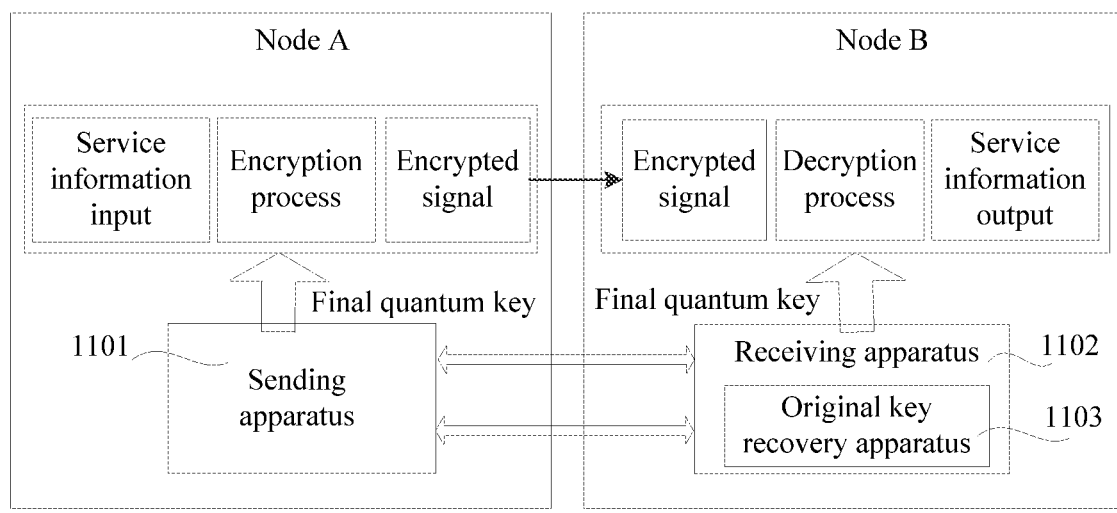
FIG. 2a is a schematic structural diagram of a system applicable to an embodiment of the present invention.
Figure 2B:
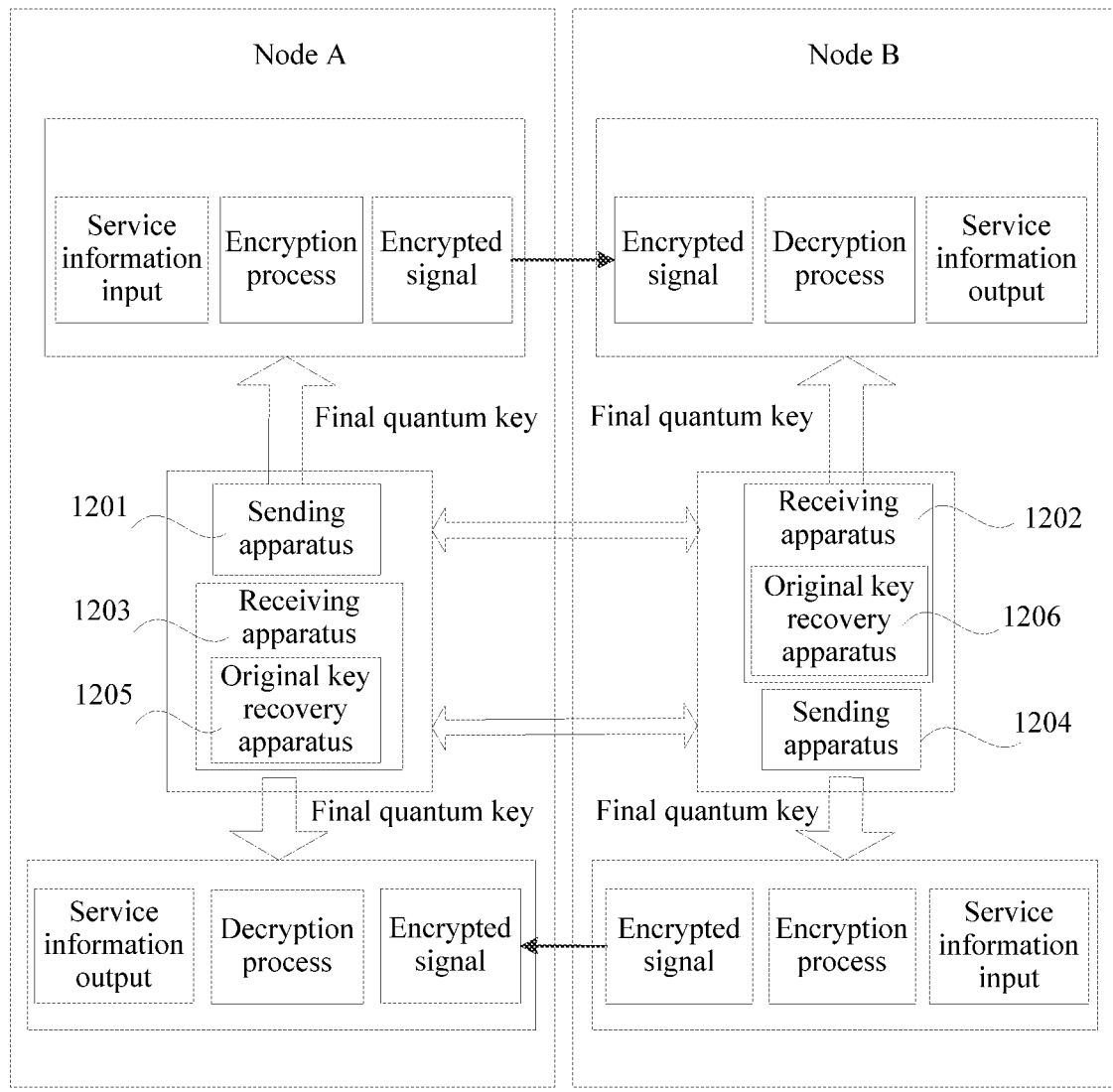
FIG. 2b is a schematic structural diagram of another system applicable to an embodiment of the present invention.

FIG. 2a shows an example of a schematic structural diagram of a system applicable to an embodiment of the present invention, and FIG. 2b shows an example of a schematic structural diagram of another system applicable to an embodiment of the present invention.

As shown in FIG. 2a, in a system architecture applicable to this embodiment of the present invention, a node A includes only a sending apparatus 1101, a node B includes only a receiving apparatus 1102, and the receiving apparatus 1102 includes an original key recovery apparatus 1103. This system architecture is referred to as a one-way system architecture. The sending apparatus 1101 at the node A adds an original key to a quantum optical signal and sends the quantum optical signal to the receiving apparatus 1102. The original key recovery apparatus 1103 included in the receiving apparatus 1102 recovers the original key from the quantum optical signal, so that the sending apparatus 1101 and the receiving apparatus 1102 determine a final quantum key from the original key through negotiation. Further, the sending apparatus 1101 at the node A receives input service information, uses the final quantum key to perform an encryption process on the service information to obtain an encrypted signal, and sends the encrypted signal to the receiving apparatus 1102. After receiving the encrypted signal, the receiving apparatus 1102 uses the same final quantum key to perform a decryption process to decrypt and output the service information, and sends the information to the sending apparatus 1101 through a classical channel.

In specific implementation, a service is usually two-way. For example, services such as voice and video calls are usually two-way. In a two-way service, each node requires encryption and decryption processing, and correspondingly, each node needs a QKD system. As shown in FIG. 2b, in a system architecture applicable to an embodiment of the present invention, a node A includes a sending apparatus 1201 and a receiving apparatus 1203, and the receiving apparatus 1203 includes an original key recovery apparatus 1205. A node B includes a receiving apparatus 1202 and a sending apparatus 1204, and the receiving apparatus 1202 also includes an original key recovery apparatus 1206. The sending apparatus 1201 and the receiving apparatus 1202 are a pair, and the sending apparatus 1204 and the receiving apparatus 1203 are a pair. This system architecture is referred to as a two-way system architecture. In this system architecture, a plurality of information transmission manners may be implemented. The pair of the sending apparatus 1201 and the receiving apparatus 1202 is used as an example for description. For example, the following may occur.

The sending apparatus 1201 at the node A adds an original key to a quantum optical signal and sends the quantum optical signal to the receiving apparatus 1202. The original key recovery apparatus 1206 of the receiving apparatus 1202 recovers the original key from the quantum optical signal, so that the sending apparatus 1201 and the receiving apparatus 1202 determine a final quantum key from the original key through negotiation.

The sending apparatus 1201 at the node A uses the final quantum key to perform encryption on received service information, and then sends the encrypted service information to the receiving apparatus 1202 at the node B. The receiving apparatus 1202 performs decryption by using the same final quantum key, and outputs the service information. The receiving apparatus 1202 sends the information to the sending apparatus 1201 through a classical channel. Alternatively, the receiving apparatus 1202 feeds back the information to the sending apparatus 1201 by using the sending apparatus 1204 and the receiving apparatus 1203.

The embodiments of the present invention are applicable to a QKD technology. The QKD technology includes discrete variable-quantum key distribution (DV-QKD) and continuous variable-quantum key distribution (CV-QKD). Because the CV-QKD does not require a single photon detector that operates at a low temperature, the CV-QKD is more widely used in engineering. Therefore, in the embodiments of the present invention, the CV-QKD technology is preferably applied.

Coherent coupling, optical-to-electrical conversion, and amplification mentioned in the embodiments of the present invention all are technical terms of coherent communication. In the embodiments of the present invention, a working principle of coherent communication is specifically as follows. A sending apparatus modulates, in an external modulation manner, a signal onto an optical carrier for transmission. When a transmit optical signal from the sending apparatus is transmitted to a receiving apparatus, the receiving apparatus performs coherent coupling on the received transmit optical signal and a local oscillator optical signal. Then a balanced detector performs detection. Alternatively, a balance receiver is used for detection. Coherent communication can be classified into heterodyne detection and homodyne detection based on inequality or equality between a frequency of the local oscillator optical signal and a frequency of the transmit optical signal.

Based on the foregoing system architectures, for an important problem of how to recover the original key from the quantum optical signal by the receiving apparatus, the following possible solution is provided.

The sending apparatus sends the transmit optical signal to the receiving apparatus, and the transmit optical signal includes a reference optical signal and a quantum optical signal of time division multiplexing. After the receiving apparatus receives the transmit optical signal, the receiving apparatus uses a local oscillator optical signal to perform coherent coupling and detection on the transmit optical signal through a coherent communications technology, then converts the coherently coupled and detected optical signal into an electrical signal through an optical-to-electrical conversion technology, amplifies the electrical signal, inputs the amplified electrical signal to an analog-to-digital converter (ADC for short) to determine phase frequency information between the local oscillator optical signal and the reference optical signal from a part, corresponding to the reference optical signal, in the electrical signal, and recovers the original key from a part, corresponding to the quantum optical signal, in the electrical signal based on the phase frequency information.

The applicant finds that in this solution, in order to recover the original key from the quantum optical signal of the transmit optical signal, a high-precision ADC needs to be used to perform high bit wide sampling quantization on a part, corresponding to the quantum optical signal, in the amplified electrical signal. To be specific, in order to ensure that the ADC can recover the original key from the part, corresponding to the quantum optical signal, in the amplified electrical signal, it needs to be ensured that an electrical signal amplitude of the part, corresponding to the quantum optical signal, in the amplified electrical signal matches a preset amplitude range of the ADC. In addition, in order to determine the phase frequency information between the local oscillator optical signal and the reference optical signal from the reference optical signal in the transmit optical signal, it needs to be ensured that an electrical signal amplitude of the part, corresponding to the reference optical signal, in the amplified electrical signal matches the preset amplitude range of the ADC.

It can be learned that in the foregoing solution, the optical signal to be converted into the electrical signal is amplified by M times, and M is a number greater than zero. In this case, the parts, corresponding to the quantum optical signal and the reference optical signal, in the converted electrical signal are both amplified by M Times. In one case, M is set to a relatively large number to ensure that an amplitude of the quantum optical signal in the amplified electrical signal matches the preset amplitude range of the ADC. In this case, light intensity of the reference optical signal included in the optical signal is originally much higher than that of the quantum optical signal. Therefore, the part, corresponding to the reference optical signal, in the amplified electrical signal is in a saturated state, and the phase frequency information in the reference optical signal may be lost. As a result, the phase frequency information between the local oscillator optical signal and the reference optical signal cannot be determined from the reference optical signal. In another case, M is set to a relatively small number to ensure that an amplitude of the reference optical signal in the amplified electrical signal matches the preset amplitude range of the ADC. In this case, light intensity of the reference optical signal included in the optical signal is originally much higher than that of the quantum optical signal. Therefore, the quantum optical signal in the amplified electrical signal is an extremely weak signal. As a result, the original key cannot be recovered from the quantum optical signal.

For the foregoing problem, the embodiments of the present invention provide an original key recovery apparatus and method. The transmit optical signal includes the reference optical signal and the quantum optical signal, optical splitting processing and coherent coupling are performed on the transmit optical signal by using the local oscillator optical signal to obtain at least two coherently coupled optical signals, and then optical-to-electrical conversion and amplification are separately performed on a first coherently coupled optical signal that includes the reference optical signal and a second coherently coupled optical signal that includes the quantum optical signal, to obtain a first electrical signal and a second electrical signal. Then, the phase frequency information between the local oscillator optical signal and the reference optical signal is obtained from the first electrical signal, and the original key is recovered from the second electrical signal based on the phase frequency information. To be specific, the first coherently coupled optical signal and the second coherently coupled optical signal may be separately amplified. In this case, an amplification factor corresponding to the first coherently coupled optical signal is adjusted to a smaller value, so that the phase frequency information between the local oscillator optical signal and the reference optical signal is determined from the first electrical signal. An amplification factor corresponding to the second coherently coupled optical signal is adjusted to a larger value, so that the original key is recovered from at least one second electrical signal. It can be learned that the method provided in the embodiments of the present invention successfully resolves the problem existing in the foregoing solution. The following provides more detailed description about the embodiments of the present invention.

Figure 3A:
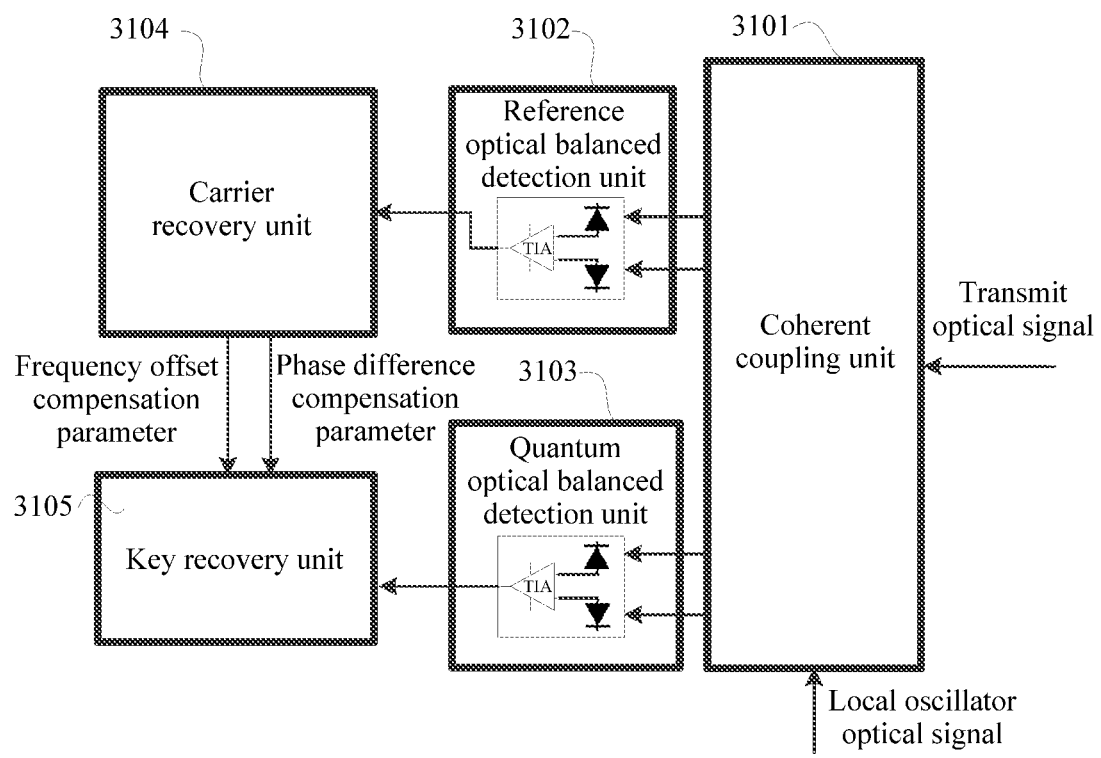
FIG. 3a is a schematic structural diagram of an original key recovery apparatus according to an embodiment of the present invention.

FIG. 3a shows an example of a schematic structural diagram of an original key recovery apparatus according to an embodiment of the present invention.

Based on the foregoing system architectures and related descriptions, as shown in FIG. 3a, an original key recovery apparatus provided in this embodiment of the present invention includes a coherent coupling unit 3101, a reference optical balanced detection unit 3102 and a quantum optical balanced detection unit 3103 that are connected to the coherent coupling unit 3101, a carrier recovery unit 3104 connected to the reference optical balanced detection unit 3102, and a key recovery unit 3105 connected to the quantum optical balanced detection unit 3103, where the carrier recovery unit 3104 is connected to the key recovery unit 3105.

The coherent coupling unit 3101 is configured to perform optical splitting processing and coherent coupling on a received transmit optical signal based on a local oscillator optical signal to obtain at least two coherently coupled optical signals, where the transmit optical signal includes a reference optical signal and a quantum optical signal, the at least two coherently coupled optical signals include at least one first coherently coupled optical signal and at least one second coherently coupled optical signal, each first coherently coupled optical signal includes at least the reference optical signal, and each second coherently coupled optical signal includes at least the quantum optical signal. The transmit optical signal is specifically an optical signal transmitted by a sending apparatus to a receiving apparatus.

The reference optical balanced detection unit 3102 is configured to perform optical-to-electrical conversion and amplification on the at least one first coherently coupled optical signal to obtain at least one first electrical signal, and transmit the at least one first electrical signal to the carrier recovery unit 3104. Optionally, the reference optical balanced detection unit 3102 may include a reference optical balanced detector or may include a reference optical balanced detection receiver.

The quantum optical balanced detection unit 3103 is configured to perform optical-to-electrical conversion and amplification on the at least one second coherently coupled optical signal to obtain at least one second electrical signal, and transmit the at least one second electrical signal to the key recovery unit 3105. Optionally, the quantum optical balanced detection unit 3103 may include a quantum optical balanced detector or may include a quantum optical balanced detection receiver.

The carrier recovery unit 3104 is configured to determine, from the at least one first electrical signal, phase frequency information between the local oscillator optical signal and the reference optical signal, and send the phase frequency information to the key recovery unit 3105. Optionally, the phase frequency information may include information such as a phase difference and a frequency difference that are between the local oscillator optical signal and the reference optical signal.

The key recovery unit 3105 is configured to recover an original key from the at least one second electrical signal based on the received phase frequency information.

Specifically, in this embodiment of the present invention, a working principle used by the key recovery unit 3105 to recover the original key from the second electrical signal based on the received phase frequency information is as follows. The phase frequency information, for example, a phase difference, between the reference optical signal and the local oscillator optical signal is obtained through detection, and then the phase frequency information between the reference optical signal and the local oscillator optical signal is sent to a local oscillator unit, so that the local oscillator unit estimates estimated phase frequency information between the quantum optical signal and the local oscillator optical signal based on the phase frequency information between the reference optical signal and the local oscillator optical signal. Then the estimated phase frequency information between the quantum optical signal and the local oscillator optical signal is used to perform modulation phase compensation on the local oscillator optical signal that is used to perform coherent coupling on the quantum optical signal, and the modulated local oscillator optical signal and the quantum optical signal are used to perform coherent coupling. The key recovery unit further performs compensation with reference to the phase frequency information fed back by the carrier recovery unit, and recovers the original key from a coherently coupled quantum optical signal.

In this embodiment of the present invention, the transmit optical signal includes the reference optical signal and the quantum optical signal, optical splitting processing and coherent coupling are performed on the transmit optical signal using the local oscillator optical signal to obtain the at least two coherently coupled optical signals, and then optical-to-electrical conversion and amplification are separately performed on the first coherently coupled optical signal that includes the reference optical signal and the second coherently coupled optical signal that includes the quantum optical signal, to obtain the first electrical signal and the second electrical signal. Then, the phase frequency information between the local oscillator optical signal and the reference optical signal is obtained from the first electrical signal, and the original key is recovered from the second electrical signal based on the phase frequency information.

Optionally, an amplification factor of a trans-impedance amplifier included in the reference optical balanced detection unit is less than that of a trans-impedance amplifier included in the quantum optical balanced detection unit.

Optionally, bandwidth of the reference optical balanced detection unit is higher than that of the quantum optical balanced detection unit, and a gain of the reference optical balanced detection unit is lower than that of the quantum optical balanced detection unit.

In this embodiment of the present invention, the first coherently coupled optical signal and the second coherently coupled optical signal may be separately amplified. In this case, an amplification factor corresponding to the first coherently coupled optical signal is adjusted to a smaller value, so that the phase frequency information between the local oscillator optical signal and the reference optical signal is determined from the first electrical signal. An amplification factor corresponding to the second coherently coupled optical signal is adjusted to a larger value, so that the original key is recovered from the at least one second electrical signal. Therefore, the phase frequency information can be recovered from the reference optical signal more accurately based on the first coherently coupled optical signal, and the original key can also be recovered from the quantum optical signal more accurately based on the second coherently coupled optical signal.

Figure 3B:
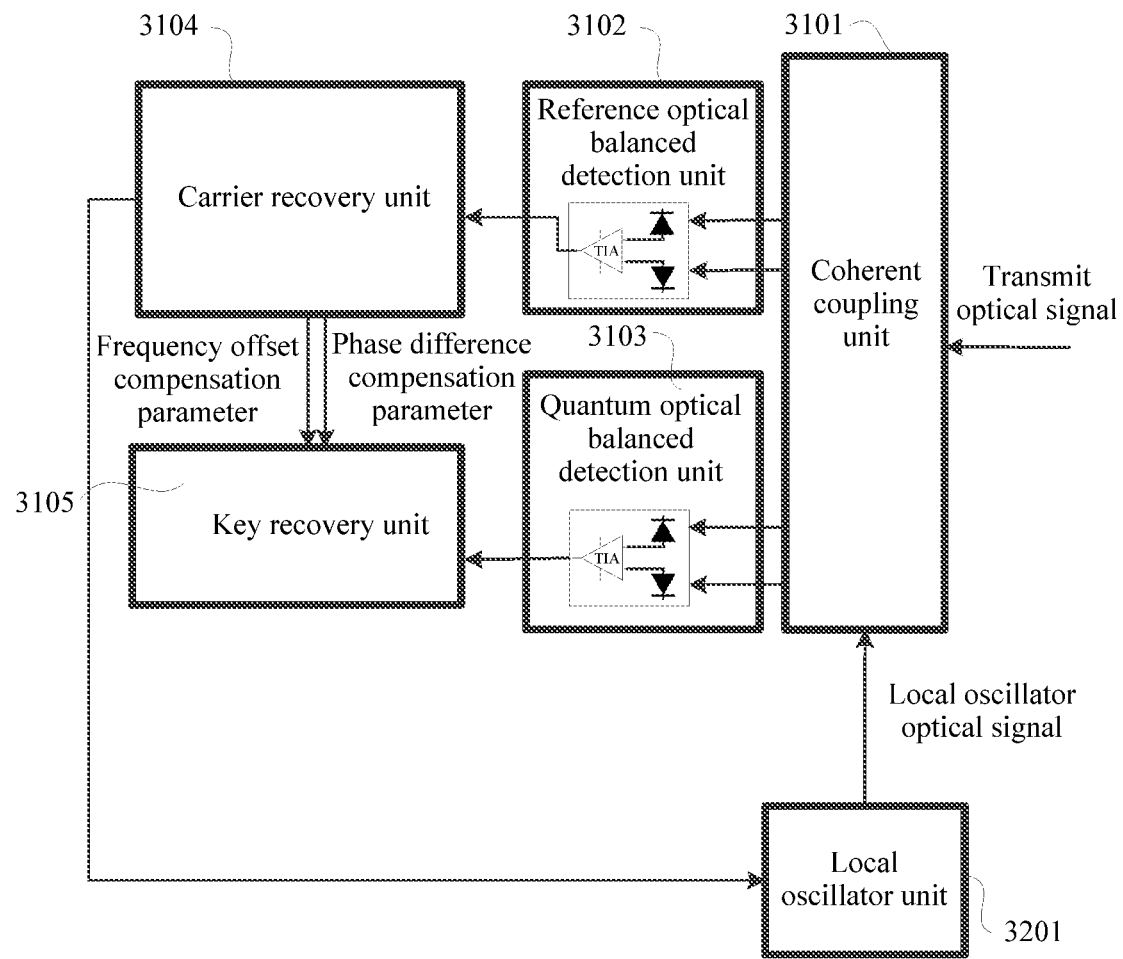
FIG. 3b is a schematic structural diagram of another original key recovery apparatus according to an embodiment of the present invention.

FIG. 3b shows an example of a schematic structural diagram of another original key recovery apparatus according to an embodiment of the present invention. As shown in FIG. 3b, in addition to a coherent coupling unit 3101, a reference optical balanced detection unit 3102 and a quantum optical balanced detection unit 3103 that are connected to the coherent coupling unit 3101, a carrier recovery unit 3104 connected to the reference optical balanced detection unit 3102, and a key recovery unit 3105 connected to the quantum optical balanced detection unit 3103, the original key recovery apparatus further includes a local oscillator unit 3201 connected to the carrier recovery unit 3104 and the coherent coupling unit 3101. The local oscillator unit is configured to receive phase frequency information sent by the carrier recovery unit, and generate a local oscillator optical signal based on the received phase frequency information, and send the local oscillator optical signal to the coherent coupling unit.

Optionally, the local oscillator optical signal includes a first local oscillator optical signal used to fit a reference optical signal in a transmit optical signal, and a second local oscillator optical signal used to fit a quantum optical signal in the transmit optical signal. A phase of the first local oscillator optical signal is one of preset fixed phase values, and a phase of the second local oscillator optical signal is a random value of the preset fixed phase values.

Figure 3C:
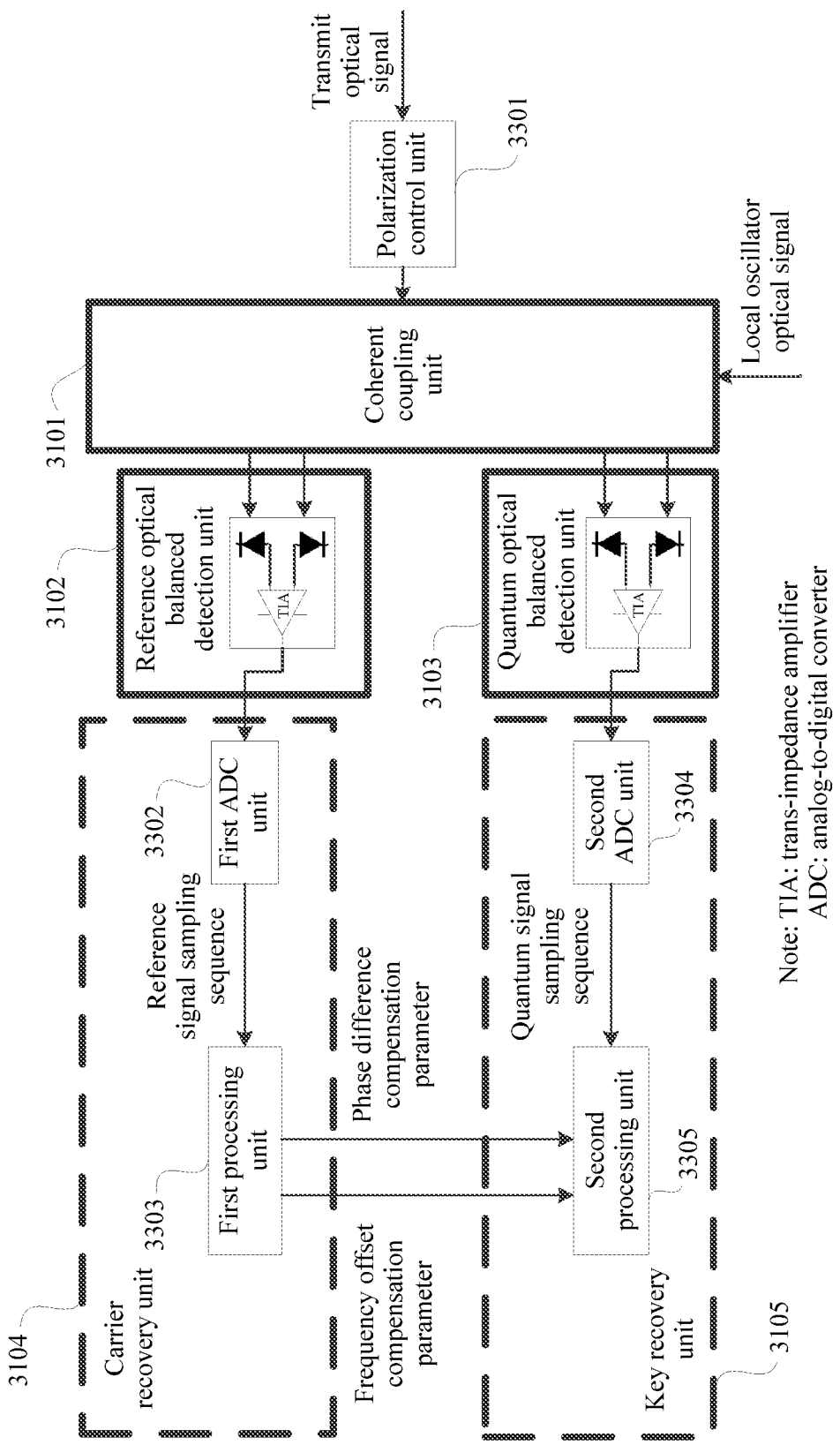
FIG. 3c is a schematic structural diagram of still another original key recovery apparatus according to an embodiment of the present invention.

FIG. 3c shows an example of a schematic structural diagram of still another original key recovery apparatus according to an embodiment of the present invention. As shown in FIG. 3c, in addition to a coherent coupling unit 3101, a reference optical balanced detection unit 3102 and a quantum optical balanced detection unit 3103 that are connected to the coherent coupling unit 3101, a carrier recovery unit 3104 connected to the reference optical balanced detection unit 3102, and a key recovery unit 3105 connected to the quantum optical balanced detection unit 3103, the original key recovery apparatus further includes a polarization control unit 3301 connected to the coherent coupling unit 3101, where the polarization control unit 3301 is configured to: receive a transmit optical signal, and adjust a polarization state of the received transmit optical signal to a fixed polarization state; and send the transmit optical signal in the fixed polarization state to the coherent coupling unit.

Specifically, a sending apparatus transmits a transmit optical signal to the original key recovery apparatus through an optical fiber, the transmit optical signal first enters the polarization control unit 3301, and a polarization state of the transmit optical signal that enters the polarization control unit 3301 changes in real time. In this case, the polarization state of the transmit optical signal can be tracked and adjusted in real time using the polarization control unit 3301, so that the transmit optical signal that is output to the coherent coupling unit 3101 is in a determined polarization state. Further, it is ensured that the polarization state of the transmit optical signal that is output to the coherent coupling unit 3101 is the same as that of a local oscillator optical signal. Optionally, the polarization control unit 3301 may be a dynamic polarization controller.

FIG. 3c shows an example of a schematic structural diagram of still another original key recovery apparatus according to an embodiment of the present invention. As shown in FIG. 3c, based on FIG. 3a, a schematic diagram of an internal structure of a possible carrier recovery unit and a schematic diagram of an internal structure of a possible key recovery unit are added.

As shown in FIG. 3c, the carrier recovery unit 3104 includes a first ADC unit 3302 connected to the reference optical balanced detection unit 3102 and a first processing unit 3303 connected to the first ADC unit 3302.

The first ADC unit 3302 is configured to receive at least one first electrical signal, perform sampling quantization on each of the at least one first electrical signal to obtain a reference signal sampling sequence, and send the reference signal sampling sequence to the first processing unit 3303. An electrical signal amplitude that is in a corresponding first electrical signal and that corresponds to a reference optical signal included in each first coherently coupled optical signal is in a first preset amplitude range of the first ADC unit 3302.

The first processing unit 3303 is configured to determine phase frequency information between the local oscillator optical signal and the reference optical signal based on the received reference signal sampling sequence, and send the phase frequency information to the key recovery unit 3105.

As shown in FIG. 3c, the key recovery unit 3105 includes a second ADC unit 3304 connected to the quantum optical balanced detection unit 3103 and a second processing unit 3305 connected to the second ADC unit 3304. Optionally, the first processing unit 3303 is connected to the second processing unit 3305.

The second ADC unit 3304 is configured to receive at least one second electrical signal, perform sampling quantization on each of the at least one second electrical signal to obtain a quantum signal sampling sequence, and send the quantum signal sampling sequence to the second processing unit 3305. An electrical signal amplitude that is in a corresponding second electrical signal and that corresponds to a quantum optical signal included in each second coherently coupled optical signal is in a second preset amplitude range of the second ADC unit 3304.

The second processing unit 3305 is configured to recover an original key based on the received quantum signal sampling sequence and the received phase frequency information.

In specific implementation, the first ADC unit 3302 may include one or more ADCs, and the second ADC unit 3304 may include one or more ADCs. The first preset amplitude range of the first ADC unit 3302 is an amplitude range in which an ADC included in the first ADC unit 3302 can perform sampling quantization, and the second preset amplitude range of the second ADC unit 3304 is an amplitude range in which an ADC included in the second ADC unit 3304 can perform sampling quantization.

In this embodiment of the present invention, the optical signal sent by the sending apparatus may be sent based on one polarization state or may be sent using a plurality of polarization states. For different cases, the original key recovery apparatus is separately described in this embodiment of the present invention.

Case 1: The transmit optical signal is transmitted based on one polarization state.

Figure 4A:
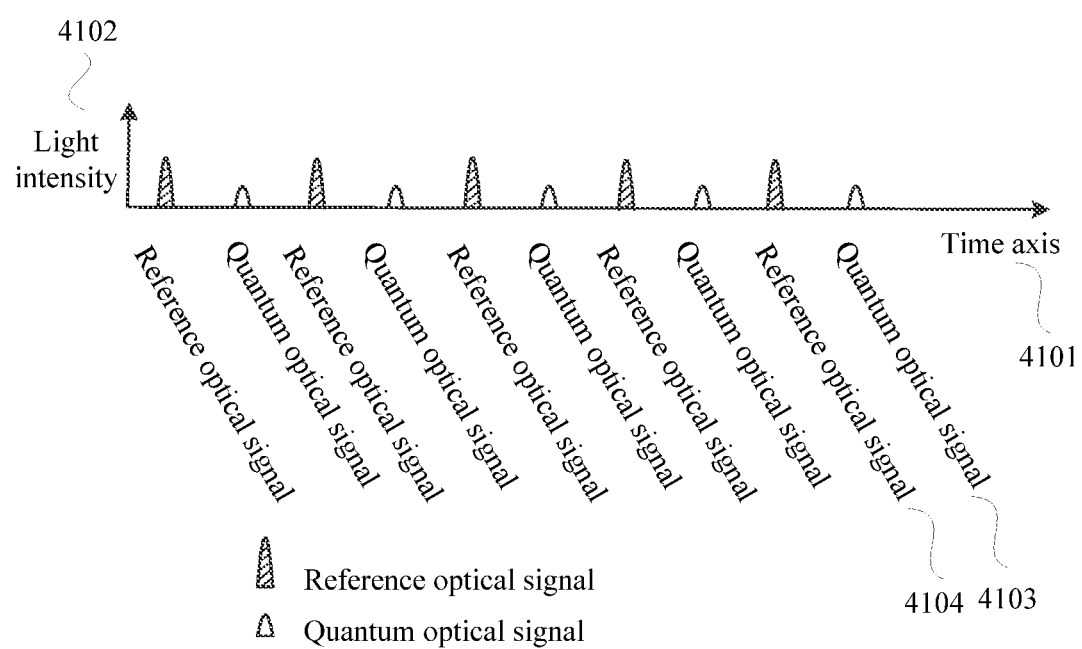
FIG. 4a is a schematic structural diagram of a transmit optical signal according to an embodiment of the present invention.

If the transmit optical signal is transmitted based on one polarization state, the transmit optical signal includes a reference optical signal and a quantum optical signal of time division multiplexing. FIG. 4a shows an example of a schematic structural diagram of a transmit optical signal according to an embodiment of the present invention. As shown in FIG. 4a, a horizontal axis is a time axis 4101, and a vertical axis is light intensity 4102. Optionally, a quantum optical signal 4103 and a reference optical signal 4104 are alternately sent over time. Optionally, one quantum optical signal 4103 may be sent after a plurality of reference optical signals 4104 are sent consecutively, or one reference optical signal 4104 may be sent after a plurality of quantum optical signals 4103 are sent consecutively. In this embodiment of the present invention, specific forms of the reference optical signal and the quantum optical signal of time division multiplexing are not limited.

When the transmit optical signal is transmitted based on one polarization state, a coherent coupling unit may have a plurality of forms. The following lists two optional embodiments: Embodiment a1 and Embodiment a2.

Embodiment a1

Optionally, if the transmit optical signal is transmitted based on one polarization state, the transmit optical signal includes a reference optical signal and a quantum optical signal of time division multiplexing. The coherent coupling unit includes a first optical splitting unit, and a first coupling unit and a second coupling unit that are connected to the first optical splitting unit, the first coupling unit is connected to the reference optical balanced detection unit, and the second coupling unit is connected to the quantum optical balanced detection unit.

The local oscillator unit is specifically configured to split the local oscillator optical signal into two first local oscillator optical sub-signals, and respectively send the two first local oscillator optical sub-signals to the first coupling unit and the second coupling unit.

The first optical splitting unit is configured to receive the transmit optical signal, perform optical splitting processing on the transmit optical signal to obtain two optically split optical signals, and respectively input the two optically split optical signals to the first coupling unit and the second coupling unit.

The first coupling unit is configured to use one of the two received first local oscillator optical sub-signals to perform coherent coupling on one of the two received optically split optical signals, so as to obtain one of the at least two coherently coupled optical signals.

The second coupling unit is configured to use the other of the two received first local oscillator optical sub-signals to perform coherent coupling on the other of the two received optically split optical signals, so as to obtain another of the at least two coherently coupled optical signals.

Figure 4B:
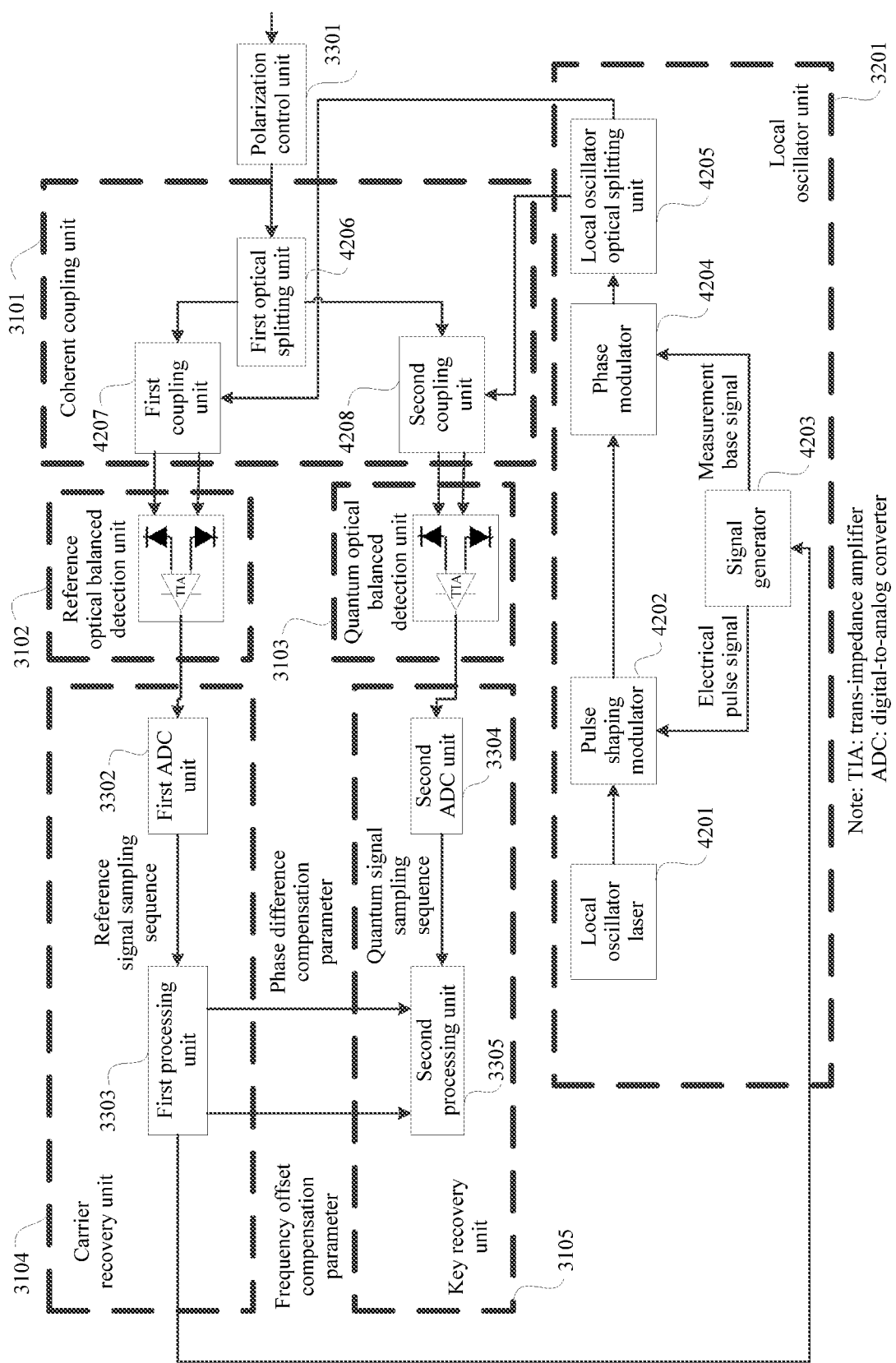
FIG. 4b is a schematic structural diagram of yet another original key recovery apparatus according to an embodiment of the present invention.

To describe a specific structure and a working principle of the original key recovery apparatus in Embodiment a1 more clearly, FIG. 4b shows an example of a schematic structural diagram of an original key recovery apparatus according to an embodiment of the present invention. As shown in FIG. 4b, a coherent coupling unit 3101 includes a first optical splitting unit 4206, and a first coupling unit 4207 and a second coupling unit 4208 that are connected to the first optical splitting unit 4206. The first coupling unit 4207 is connected to a reference optical balanced detection unit 3102, and the second coupling unit 4208 is connected to a quantum optical balanced detection unit 3103.

Specifically, an input end of the first optical splitting unit 4206 is connected to a polarization control unit 3301. Two output ends of the first optical splitting unit 4206 are connected to the first coupling unit 4207 and the second coupling unit 4208, respectively. Two input ends of the first coupling unit 4207 are connected to the first optical splitting unit 4206 and a local oscillator optical splitting unit 4205 that is in a local oscillator unit 3201, respectively. Two input ends of the second coupling unit 4208 are connected to the first optical splitting unit 4206 and the local oscillator optical splitting unit 4205 that is in the local oscillator unit 3201, respectively. Two output ends of the first coupling unit 4207 are separately connected to the reference optical balanced detection unit 3102, and two output ends of the second coupling unit 4208 are separately connected to the quantum optical balanced detection unit 3103. Optionally, the first coupling unit 4207 and the second coupling unit 4208 each may be a 2:2 coupler, and the first optical splitting unit 4206 may be an optical splitter.

As shown in FIG. 4b, the local oscillator unit 3201 includes a local oscillator laser 4201, a pulse shaping modulator 4202 connected to the local oscillator laser 4201, a phase modulator 4204 connected to the pulse shaping modulator 4202, and a signal generator 4203 connected to both the phase modulator 4204 and the pulse shaping modulator 4202. The signal generator 4203 is connected to the first processing unit 3303 in the carrier recovery unit 3104. The local oscillator unit 3201 further includes the local oscillator optical splitting unit 4205. One end of the local oscillator optical splitting unit 4205 is connected to the phase modulator 4204, and the other ends thereof are connected to the first coupling unit 4207 and the second coupling unit 4208, respectively. The local oscillator optical splitting unit 4205 may be an optical splitter.

Based on the schematic structural diagram of the original key recovery apparatus shown in FIG. 4b, the following describes in detail a workflow of the original key recovery apparatus.

As shown in FIG. 4b, a sending apparatus transmits a transmit optical signal to the original key recovery apparatus through an optical fiber, and the transmit optical signal first enters the polarization control unit 3301. The polarization control unit 3301 tracks and adjusts a polarization state of the transmit optical signal in real time, so that the transmit optical signal that is output to the first optical splitting unit 4206 is in a determined polarization state. Further, it is ensured that the polarization state of the transmit optical signal that is output to the first optical splitting unit 4206 is the same as that of a local oscillator optical signal. The polarization control unit 3301 inputs, to an input end of the first optical splitting unit 4206, the transmit optical signal whose polarization state is fixed.

The local oscillator laser 4201 outputs continuous local oscillator optical pulses to the pulse shaping modulator 4202. The pulse shaping modulator 4202 modulates the received continuous local oscillator optical pulses and outputs a pulse light to the phase modulator 4204. After performing further phase modulation on the received pulse light, the phase modulator 4204 outputs, to the local oscillator optical splitting unit, the local oscillator optical signal that carries phase frequency information. The coherent coupling unit includes the first coupling unit 4207 and the second coupling unit 4208, and the first coupling unit 4207 and the second coupling unit 4208 separately need to perform a coherent coupling operation. Therefore, the first coupling unit 4207 and the second coupling unit 4208 both need the local oscillator optical signal. Based on this, the local oscillator optical splitting unit splits the received local oscillator optical signal into two first local oscillator optical sub-signals, and sends the two first local oscillator optical sub-signals to the first coupling unit 4207 and the second coupling unit 4208, respectively.

Specifically, when the local oscillator unit 3201 needs to output only one local oscillator optical signal, the local oscillator unit may directly output one local oscillator optical signal to the coherent coupling unit 3101 using the phase modulator 4204 in the local oscillator unit 3201. If the local oscillator unit 3201 needs to output a plurality of local oscillator optical sub-signals, the phase modulator 4204 in the local oscillator unit 3201 needs to be connected to the local oscillator optical splitting unit 4205, and the local oscillator optical splitting unit 4205 is connected to the coherent coupling unit 3101. In this case, the phase modulator 4204 in the local oscillator unit 3201 outputs the local oscillator optical signal to the local oscillator optical splitting unit 4205, and the local oscillator optical splitting unit 4205 splits the local oscillator optical signal into a plurality of local oscillator optical sub-signals, and outputs the plurality of split local oscillator optical sub-signals to the coherent coupling unit 3101. Specifically, the local oscillator optical splitting unit 4205 in the local oscillator unit 3201 transmits the local oscillator optical sub-signals to a coupler in the coherent coupling unit 3101.

For example, the first optical splitting unit 4206 splits the received transmit optical signal that is input by the polarization control unit 3301 into a transmit optical signal that accounts for 10% in the transmit optical signal and a transmit optical signal that accounts for 90% in the transmit optical signal, and the local oscillator optical splitting unit also splits the received local oscillator optical signal that is input by the phase modulator 4204 into two first local oscillator optical sub-signals. One first local oscillator optical sub-signal accounts for 10% in the local oscillator optical signal, and the other first local oscillator optical sub-signal accounts for 90% in the local oscillator optical signal. Optionally, an optical splitting proportion of the local oscillator optical splitting unit may alternatively be different from an optical splitting proportion of the first optical splitting unit 4206. No specific limitation is imposed in this embodiment of the present invention.

The signal generator 4203 is configured to generate an electrical pulse signal to be input to the pulse shaping modulator 4202 and a phase modulation signal to be input to the phase modulator 4204, so that the pulse shaping modulator 4202 modulates the received continuous local oscillator optical pulses based on the received electrical pulse signal, and the phase modulator 4204 performs phase modulation on the received pulse light based on the received phase modulation signal.

Optionally, the transmit optical signal received by the polarization control unit 3301 includes the reference optical signal and the quantum optical signal. When the first coupling unit 4207 and the second coupling unit 4208 respectively use the two first local oscillator optical sub-signals to fit the transmit optical signal, for each first local oscillator optical sub-signal in the two first local oscillator optical sub-signals, each first local oscillator optical sub-signal includes a first local oscillator optical signal used to fit the reference optical signal in the transmit optical signal and a second local oscillator optical signal used to fit the quantum optical signal in the transmit optical signal. In other words, the local oscillator optical signal that is output by the phase modulator 4204 in the local oscillator unit 3201 includes the first local oscillator optical signal and the second local oscillator optical signal of time division multiplexing.

A phase of the first local oscillator optical signal is one of preset fixed phase values, and a phase of the second local oscillator optical signal is a random value of the preset fixed phase values. The preset fixed phase values maybe, for example, 0 and $\pi/2$. That a phase of the first local oscillator optical signal is one of preset fixed phase values specifically means that phases of the first local oscillator optical signal all are 0 or $\pi/2$. That a phase of the second local oscillator optical signal is a random value of the preset fixed phase values specifically means that the phase of the second local oscillator optical signal is 0 at a current moment, and is $\pi/2$ at a next moment or o again at a next moment.

Specifically, the phase of the first local oscillator optical signal is one of the preset fixed phase values, so as to maintain a fixed difference, for example, 0 or $\pi/2$, between an optical signal that is input by the polarization control unit 3301 at an input end of a 2:2 coupler and the first local oscillator optical signal. The phase of the second local oscillator optical signal is a random value of the preset fixed phase values, so that a phase difference between the optical signal that is input by the polarization control unit 3301 at the input end of the 2:2 coupler and the second local oscillator optical signal is a random number in 0 and $\pi/2$, and 0 and $\pi/2$ correspond to different measurement bases.

Further, in an ideal case, the local oscillator optical signal that is output by the local oscillator unit 3201 and the transmit optical signal that is received by the coherent coupling unit have a same frequency and phase. However, in an actual running system, the local oscillator unit 3201 and the sending apparatus that generates the transmit optical signal are located at two locations, and output frequencies of the local oscillator unit 3201 and the sending apparatus are separately controlled. It cannot be ensured that the frequencies of the local oscillator unit 3201 and the sending apparatus are identical, and it cannot be further ensured that phases of the local oscillator unit 3201 and the sending apparatus are identical. In addition, a change in a temperature of an external environment may result in a change in a length of an optical fiber, and consequently, a system may be inevitably disturbed, generating a new phase difference. To ensure a phase relationship between the local oscillator optical signal received at an input end of the coherent coupling unit and the transmit optical signal that is input by the polarization control unit 3301, the signal generator 4203 in the local oscillator unit 3201 needs to receive a synchronization clock parameter and the phase frequency information such as a phase compensation parameter that are output by the first processing unit 3303 in the carrier recovery unit 3104, and then the signal generator 4203 adjusts, in real time, the electrical pulse signal that is input to the pulse shaping modulator 4202 and the phase modulation signal that is input to the phase modulator 4204, so as to adjust, in real time, the phase frequency information of the local oscillator optical signal that is input to the coherent coupling unit.

The first optical splitting unit 4206 receives the transmit optical signal, performs optical splitting processing on the transmit optical signal to obtain two optically split optical signals, and respectively inputs the two optically split optical signals to the first coupling unit 4207 and the second coupling unit 4208.

Optionally, the quantum optical signal is an extremely weak optical signal, and an insertion loss value on an entire transmission link severely affects a transmission distance of the quantum optical signal. Therefore, preferably, on the premise that after optical-to-electrical conversion and amplification are performed on the reference optical signal, normal sampling can be ensured and accurate phase frequency information can be recovered, an intensity proportion of light that is input to the quantum optical balanced detection unit 3103 can be improved as large as possible. For example, the first optical splitting unit 4206 splits the received transmit optical signal into a transmit optical signal that accounts for 20% in the transmit optical signal and a transmit optical signal that accounts for 80% in the transmit optical signal, sends the transmit optical signal that accounts for 20% to the first coupling unit 4207, and sends the transmit optical signal that accounts for 80% to the second coupling unit 4208.

The first coupling unit 4207 uses one of the two received first local oscillator optical sub-signals to perform coherent coupling on one of the two received optically split optical signals, so as to obtain one coherently coupled optical signal.

The second coupling unit 4208 is configured to use the other of the two received first local oscillator optical sub-signals to perform coherent coupling on the other of the two received optically split optical signals, so as to obtain the other coherently coupled optical signal.

In this case, it can be learned that the transmit optical signal is transmitted based on one polarization state, the transmit optical signal includes the reference optical signal and the quantum optical signal of time division multiplexing, each first coherently coupled optical signal includes at least the reference optical signal, and each second coherently coupled optical signal includes at least the quantum optical signal. Therefore, the coherently coupled optical signal that is output by the first coupling unit 4207 includes the reference optical signal and the quantum optical signal, and the coherently coupled optical signal that is output by the second coupling unit 4208 also includes the reference optical signal and the quantum optical signal. In this case, if the coherently coupled optical signal that is output by the first coupling unit 4207 is used as the first coherently coupled optical signal, the coherently coupled optical signal that is output by the second coupling unit 4208 is used as the second coherently coupled optical signal.

The reference optical balanced detection unit 3102 performs optical-to-electrical conversion and amplification on the received first coherently coupled optical signal. Because light intensity of the reference optical signal in the optical signal sent by the sending apparatus is far higher than that of the quantum optical signal, usually an amplification factor of a trans-impedance amplifier in the reference optical balanced detection unit 3102 is a relatively small value to ensure that after the reference optical balanced detection unit 3102 performs trans-impedance amplification on a converted electrical signal, an amplitude of an output first electrical signal is in a first preset amplitude range of the first ADC unit 3302. Therefore, the first ADC unit 3302 accurately performs sampling quantization on the first electrical signal. In this case, an electrical signal amplitude that is in a corresponding first electrical signal and that corresponds to the reference optical signal is in the first preset amplitude range of the first ADC unit 3302. However, an electrical signal amplitude that is in a corresponding first electrical signal and that corresponds to the quantum optical signal is very small, that is, the first ADC unit 3302 cannot extract an original key from the first electrical signal through sampling quantization.

The quantum optical balanced detection unit 3103 performs optical-to-electrical conversion and amplification on the received second coherently coupled optical signal. Because light intensity of the reference optical signal in the optical signal sent by the sending apparatus is far higher than that of the quantum optical signal, usually an amplification factor of a trans-impedance amplifier in the quantum optical balanced detection unit 3103 is a relatively large value to ensure that after the quantum optical balanced detection unit 3103 performs trans-impedance amplification on a converted electrical signal, an amplitude of an output second electrical signal is in a second preset amplitude range of the second ADC unit 3304. Therefore, the second ADC unit 3304 accurately performs sampling quantization on the second electrical signal. In this case, an electrical signal amplitude that is in a corresponding second electrical signal and that corresponds to the quantum optical signal is in the second preset amplitude range of the second ADC unit 3304. However, an electrical signal amplitude that is in a corresponding second electrical signal and that corresponds to the reference optical signal is very large, is limited by a maximum output value of the trans-impedance amplifier (TIA), and is already in a saturated state. That is, the second ADC unit 3304 cannot extract phase frequency information from the second electrical signal through sampling quantization.

The first ADC unit 3302 receives the first electrical signal that is output by the reference optical balanced detection unit 3102, performs sampling quantization on the received first electrical signal, and outputs a reference signal sampling sequence to the first processing unit 3303 in the carrier recovery unit 3104. The first processing unit 3303 in the carrier recovery unit 3104 determines the phase frequency information between the local oscillator optical signal and the reference optical signal from the reference signal sampling sequence. Optionally, the first processing unit 3303 in the carrier recovery unit 3104 determines clock cycle information and the like of the reference optical signal from the reference signal sampling sequence.

The second ADC unit 3304 performs sampling quantization on the received second electrical signal, and outputs a quantum signal sampling sequence to the second processing unit 3305 in the carrier recovery unit 3104. The second processing unit 3305 in the key recovery unit 3105 recovers the original key from the quantum signal sampling sequence based on the received phase frequency information. In specific implementation, the key recovery unit 3105 calculates and compensates for the received quantum signal sampling sequence based on the phase frequency information that is input by the carrier recovery unit 3104, so as to recover the original key from the quantum signal sampling sequence. Optionally, in this embodiment of the present invention, the reference optical signal and the quantum optical signal do not interfere with each other in a same coupler. Therefore, there is a fixed phase difference between coupled optical signals that are respectively output by a first coupler and a second coupler. During original key recovery, the fixed phase difference needs to be considered.

Embodiment a2

If the transmit optical signal is transmitted based on one polarization state, the transmit optical signal includes a reference optical signal and a quantum optical signal of time division multiplexing. The coherent coupling unit includes a third coupling unit, and a second optical splitting unit and a third optical splitting unit that are connected to the third coupling unit. The second optical splitting unit is connected to the reference optical balanced detection unit and the quantum optical balanced detection unit, and the third optical splitting unit is connected to the reference optical balanced detection unit and the quantum optical balanced detection unit.

The third coupling unit is configured to: use the local oscillator optical signal to perform coherent coupling on the transmit optical signal, split a coherently coupled optical signal into two first coherent optical signals, and respectively input the two first coherent optical signals to the second optical splitting unit and the third optical splitting unit.

The second optical splitting unit is configured to perform optical splitting processing on one of the two received first coherent optical signals, to obtain a first coherent optical signal that accounts for a first proportion in the first coherent optical signal and a first coherent optical signal that accounts for a second proportion in the first coherent optical signal, where a sum of the first proportion and the second proportion is 1.

The third optical splitting unit is configured to perform optical splitting processing on the other of the two received first coherent optical signals, to obtain a first coherent optical signal that accounts for the first proportion in the first coherent optical signal and a first coherent optical signal that accounts for the second proportion in the first coherent optical signal.

The two first coherent optical signals that each account for the first proportion in each first coherent optical signal are used as one of the two coherently coupled optical signals, and the two first coherent optical signals that each account for the second proportion in each first coherent optical signal are used as the other of the two coherently coupled optical signals.

Figure 4C:
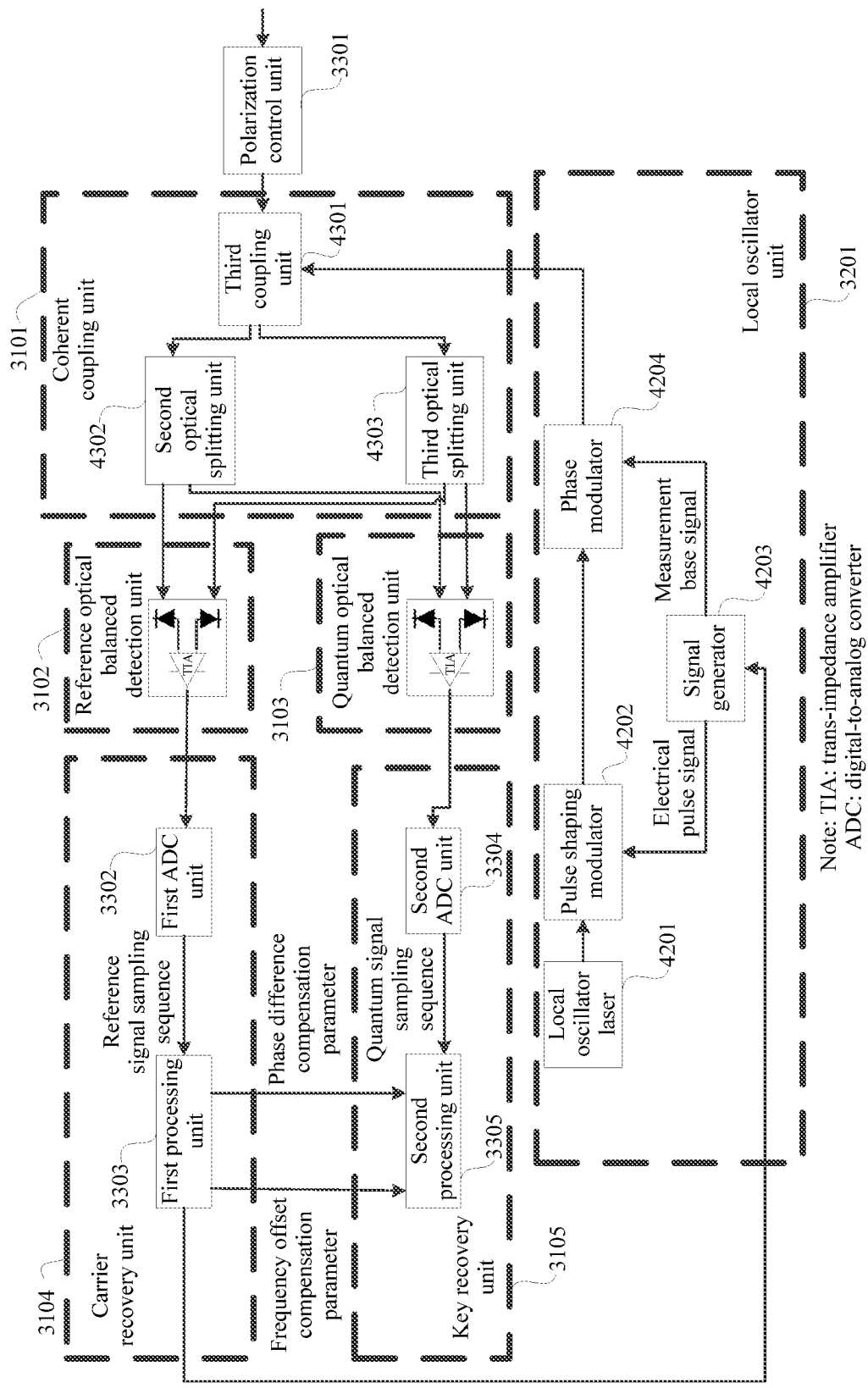
FIG. 4c is a schematic structural diagram of still yet another original key recovery apparatus according to an embodiment of the present invention.

To describe a specific structure and a working principle of the original key recovery apparatus in Embodiment a2 more clearly, FIG. 4c shows an example of a schematic structural diagram of an original key recovery apparatus according to an embodiment of the present invention. As shown in FIG. 4c, a coherent coupling unit 3101 includes a third coupling unit 4301, and a second optical splitting unit 4302 and a third optical splitting unit 4303 that are connected to the third coupling unit 4301. The second optical splitting unit 4302 is connected to a reference optical balanced detection unit 3102 and a quantum optical balanced detection unit 3103, and the third optical splitting unit 4303 is connected to the reference optical balanced detection unit 3102 and the quantum optical balanced detection unit 3103.

Specifically, two input ends of the third coupling unit 4301 are connected to a polarization control unit 3301 and a phase modulator 4204 that is in a local oscillator unit 3201, respectively. Two output ends of the third coupling unit 4301 are connected to the second optical splitting unit 4302 and the third optical splitting unit 4303, respectively. Two output ends of the second optical splitting unit 4302 are connected to the reference optical balanced detection unit 3102 and the quantum optical balanced detection unit 3103, respectively. Two output ends of the third optical splitting unit 4303 are connected to the reference optical balanced detection unit 3102 and the quantum optical balanced detection unit 3103, respectively. Optionally, the third coupling unit 4301 may be a 2:2 coupler, the second optical splitting unit 4302 may be an optical splitter, and the third optical splitting unit 4303 may be an optical splitter. Optionally, optical splitting proportions of the second optical splitting unit 4302 and the third optical splitting unit 4303 are the same.

As shown in FIG. 4c, the local oscillator unit 3201 includes a local oscillator laser 4201, a pulse shaping modulator 4202 connected to the local oscillator laser 4201, a phase modulator 4204 connected to the pulse shaping modulator 4202, and a signal generator 4203 connected to both the phase modulator 4204 and the pulse shaping modulator 4202. The signal generator 4203 is connected to a first processing unit 3303 in a carrier recovery unit 3104.

Based on the schematic structural diagram of the original key recovery apparatus shown in FIG. 4c, the following describes in detail a workflow of the original key recovery apparatus.

As shown in FIG. 4c, a sending apparatus transmits a transmit optical signal to the original key recovery apparatus through an optical fiber, the transmit optical signal first enters the polarization control unit 3301, and the polarization control unit 3301 inputs the transmit optical signal whose polarization state is fixed to an input end of the third coupling unit 4301.

In comparison with FIG. 4b, the local oscillator unit 3201 in FIG. 4c does not include a local oscillator optical splitting unit 4205. As described in FIG. 4b, when the local oscillator unit 3201 needs to output only one local oscillator optical signal, the local oscillator optical splitting unit 4205 is not needed in the local oscillator unit 3201. The phase modulator 4204 in the local oscillator unit 3201 can be directly connected to the third coupling unit 4301 in the coherent coupling unit 3101. Components in the local oscillator unit 3201 are described in FIG. 4b, and details are not described herein again.

The third coupling unit 4301 performs, based on a received local oscillator optical signal, coherent coupling on the transmit optical signal that is input by the polarization control unit 3301 to obtain two first coherent optical signals, and respectively inputs the two first coherent optical signals to the second optical splitting unit 4302 and the third optical splitting unit 4303. Optionally, optical splitting proportions of the second optical splitting unit 4302 and the third optical splitting unit 4303 are the same.

For example, a first proportion is 10% and a second proportion is 90%. The second optical splitting unit 4302 splits one received first coherent optical signal into a first coherent optical signal that accounts for 10% and a first coherent optical signal that accounts for 90%. The third optical splitting unit 4303 splits the other received first coherent optical signal into a first coherent optical signal that accounts for 10% and a first coherent optical signal that accounts for 90%. The second optical splitting unit 4302 inputs the first coherent optical signal that accounts for 10% to the reference optical balanced detection unit 3102, and the third optical splitting unit 4303 inputs the first coherent optical signal that accounts for 10% to the reference optical balanced detection unit 3102. The second optical splitting unit 4302 inputs the first coherent optical signal that accounts for 90% to the quantum optical balanced detection unit 3103, and the third optical splitting unit 4303 inputs the first coherent optical signal that accounts for 90% to the quantum optical balanced detection unit 3103. In other words, the two first coherent optical signals that each account for 10% are one coherently coupled optical signal, and the two first coherent optical signals that each account for 90% are the other coherently coupled optical signal. The first coherently coupled optical signal may be the two first coherent optical signals that each account for 10%, and the second coherently coupled optical signal may be the two first coherent optical signals that each account for 90%.

In this embodiment of the present invention, specific values of the first proportion and the second proportion are not limited. Optionally, the quantum optical signal is an extremely weak optical signal, and an insertion loss value on an entire transmission link severely affects a transmission distance of the quantum optical signal. Therefore, preferably, on the premise that after optical-to-electrical conversion and amplification are performed on the reference optical signal, normal sampling can be ensured and accurate phase frequency information can be recovered, an intensity proportion of light that is input to the quantum optical balanced detection unit 3103 can be improved as large as possible.

Further, the transmit optical signal includes a reference optical signal and a quantum optical signal, at least two coherently coupled optical signals include at least one first coherently coupled optical signal and at least one second coherently coupled optical signal, each first coherently coupled optical signal includes at least the reference optical signal, and each second coherently coupled optical signal includes at least the quantum optical signal. In other words, one coherently coupled optical signal that enters the reference optical balanced detection unit 3102 is the first coherently coupled optical signal, and one coherently coupled optical signal that enters the quantum optical balanced detection unit 3103 is the second coherently coupled optical signal.

The reference optical balanced detection unit 3102 receives the first coherently coupled optical signals output by the second optical splitting unit 4302 and the third optical splitting unit 4303. A specific processing procedure is described above. The quantum optical balanced detection unit 3103 receives the second coherently coupled optical signals output by the second optical splitting unit 4302 and the third optical splitting unit 4303. A specific processing procedure is described above. For a specific processing procedure of the carrier recovery unit 3104 and a key recovery unit 3105, refer to the foregoing description.

The foregoing content describes schematic diagrams of several possible structures used by the original key recovery apparatus when the transmit optical signal is transmitted based on one polarization state. In this embodiment of the present invention, the sending apparatus may alternatively transmit the transmit optical signal by using a plurality of polarization states. Detailed description is given below.

Case 2: The transmit optical signal is transmitted based on N polarization states, and N is an integer greater than 1.

Optionally, when the transmit optical signal is transmitted based on N polarization states, the foregoing transmitted optical signal in each polarization state may be any one of an initial optical signal that includes the reference optical signal and the quantum optical signal of time division multiplexing, an initial optical signal that includes the reference optical signal, or an initial optical signal that includes the quantum optical signal.

For example, the sending apparatus sends the transmit optical signal based on two polarization states. In each polarization state, the reference optical signal and the quantum optical signal of time division multiplexing are included. For another example, the sending apparatus sends the transmit optical signal based on two polarization states, transmits the reference optical signal based on one polarization state, and transmits the quantum optical signal based on the other polarization state. For another example, the sending apparatus sends the transmit optical signal based on two polarization states, transmits the reference optical signal and the quantum optical signal of time division multiplexing based on one polarization state, and transmits the quantum optical signal based on the other polarization state. Optionally, the sending apparatus may alternatively send the transmit optical signal based on three polarization states, four polarization states, or the like.

Figure 5A:
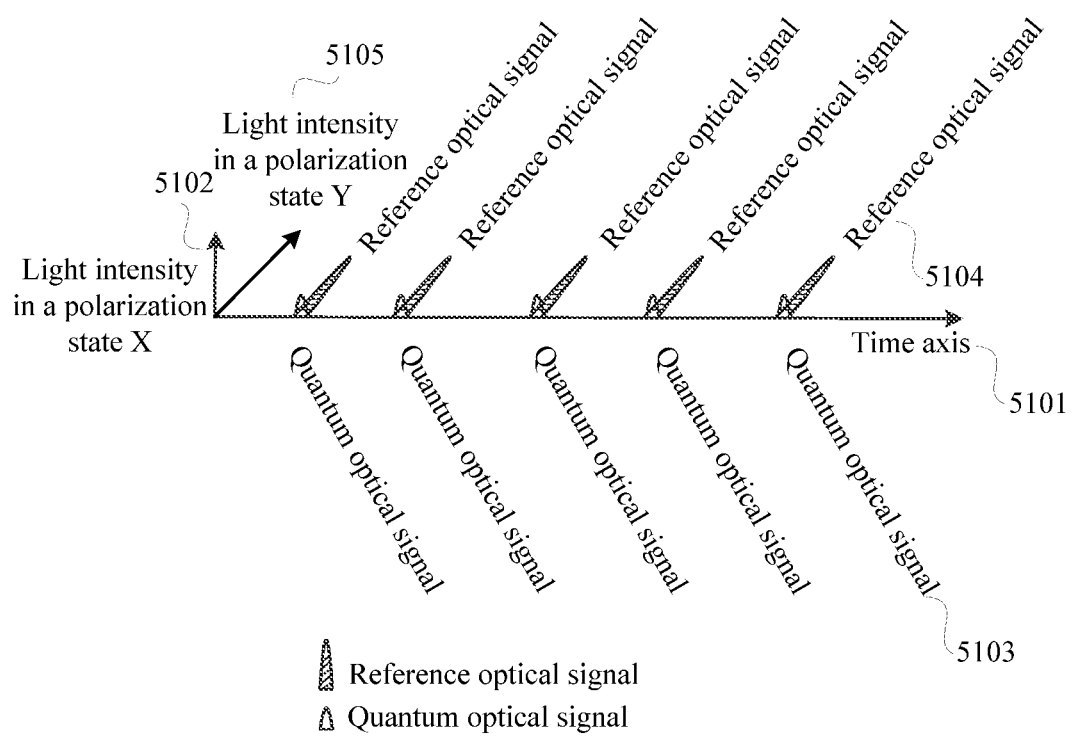
FIG. 5a is a schematic structural diagram of another transmit optical signal according to an embodiment of the present invention.

FIG. 5a shows an example of a schematic structural diagram of a transmit optical signal according to an embodiment of the present invention. As shown in FIG. 5a, a horizontal axis is a time axis 5101, and vertical axes include light intensity 5102 in a polarization state X and light intensity 5105 in a polarization state Y. Optionally, a quantum optical signal 5103 is sent based on the polarization state X, and a reference optical signal 5104 is sent based on the polarization state Y. The reference optical signal and the quantum optical signal overlap with each other in terms of time. Therefore, the reference optical signal and the quantum optical signal shown in FIG. 5a belong to polarization multiplexing signals.

Figure 5B:
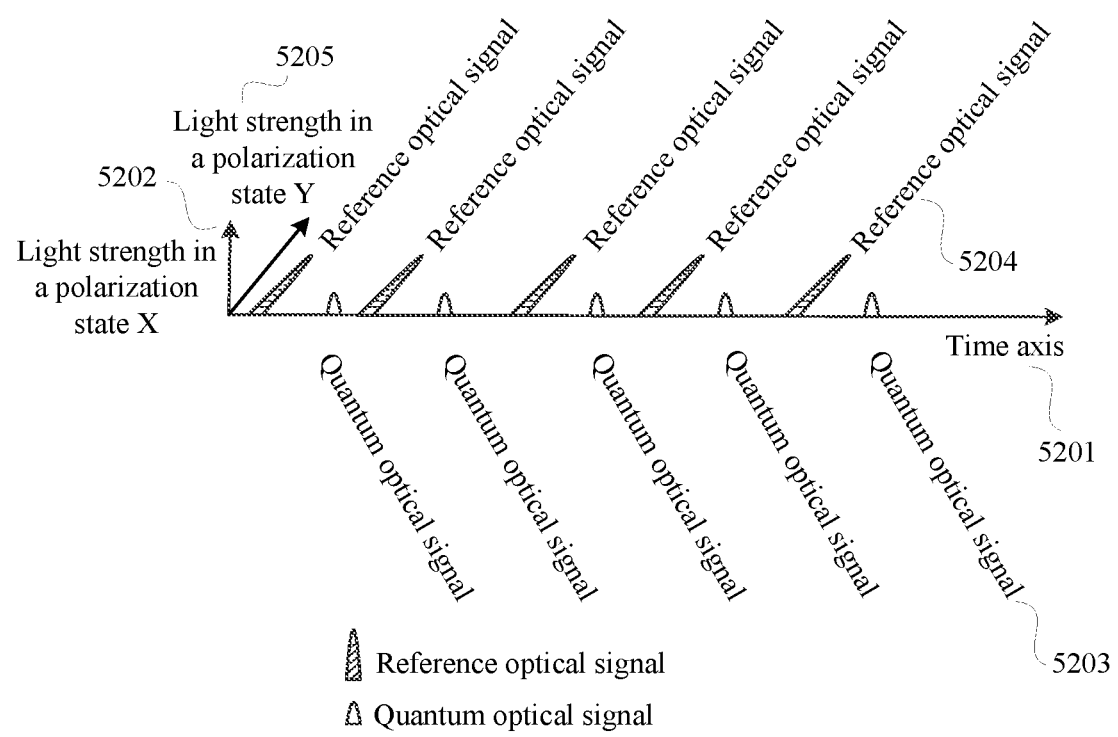
FIG. 5b is a schematic structural diagram of still another transmit optical signal according to an embodiment of the present invention.

Further, to increase isolation between the reference optical signal and the quantum optical signal and reduce interference of the reference optical signal to the quantum optical signal, a particular relative delay may be set between the reference optical signal and the quantum optical signal. FIG. 5b shows an example of a schematic structural diagram of still another transmit optical signal according to an embodiment of the present invention. As shown in FIG. 5b, a horizontal axis is a time axis 5201, and vertical axes include light intensity 5202 in a polarization state X and light intensity 5205 in a polarization state Y. Optionally, a quantum optical signal 5203 is sent based on the polarization state X, and a reference optical signal 5204 is sent based on the polarization state Y. The reference optical signal and the quantum optical signal are staggered in terms of time. In other words, in FIG. 5b, the reference optical signal in the polarization state Y and the quantum optical signal in the polarization state X not only belong to polarization multiplexing signals, but also belong to time division multiplexing signals.

Figure 5C:
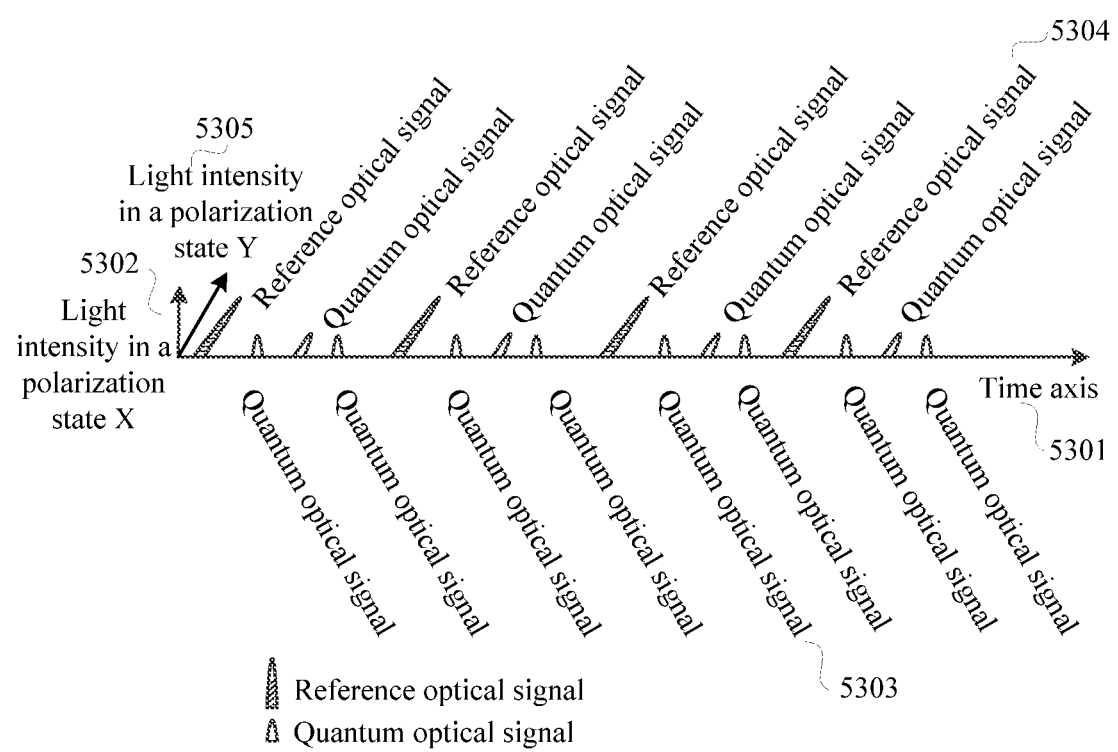
FIG. 5c is a schematic structural diagram of yet another transmit optical signal according to an embodiment of the present invention.

FIG. 5c shows an example of a schematic structural diagram of yet another transmit optical signal according to an embodiment of the present invention. As shown in FIG. 5c, a horizontal axis is a time axis 5301, and vertical axes include light intensity 5302 in a polarization state X and light intensity 5305 in a polarization state Y. Optionally, a quantum optical signal 5303 is sent based on the polarization state X, and a reference optical signal 5304 and the quantum optical signal 5303 of time division multiplexing are sent based on the polarization state Y. It can be learned that in FIG. 5c, the quantum optical signal in the polarization state X, and the reference optical signal and the quantum optical signal in the polarization state Y are both staggered in terms of time.

In this embodiment of the present invention, when the transmit optical signal is transmitted based on N polarization states, optical signals transmitted based on the polarization states may overlap or may not overlap in terms of time. This is not limited in this embodiment of the present invention.

Optionally, if the transmit optical signal is transmitted based on N polarization states, and N is an integer greater than 1, the coherent coupling unit includes a polarization optical splitting unit and a coherent coupling subunit connected to the polarization optical splitting unit. The coherent coupling subunit is connected to the reference optical balanced detection unit and the quantum optical balanced detection unit. The polarization optical splitting unit is configured to split the transmit optical signal into N optical signals through polarization optical splitting processing, and perform polarization rotation on at least (N−1) optical signals to output N initial optical signals in a same polarization state, where one initial optical signal corresponds to one polarization state. The coherent coupling subunit is configured to perform at least coherent coupling on each of the N initial optical signals based on the received local oscillator optical signal, to output at least N coherently coupled optical signals.

Figure 5D:
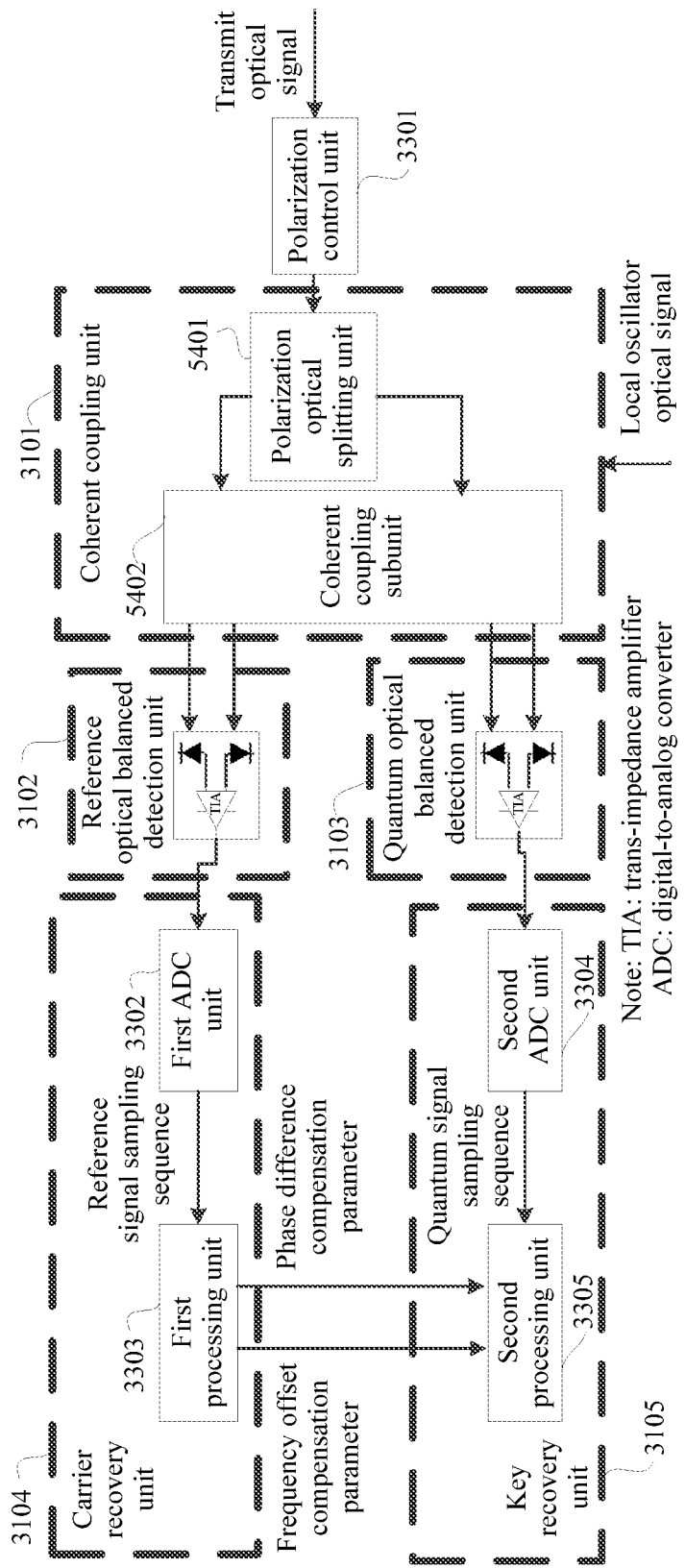
FIG. 5d is a schematic structural diagram of a further original key recovery apparatus according to an embodiment of the present invention.

FIG. 5d shows an example of a schematic structural diagram of an original key recovery apparatus according to an embodiment of the present invention. As shown in FIG. 5d, a coherent coupling unit 3101 includes a polarization optical splitting unit 5401 and a coherent coupling subunit 5402 connected to the polarization optical splitting unit 5401. The coherent coupling subunit 5402 is connected to a reference optical balanced detection unit 3102 and a quantum optical balanced detection unit 3103.

Optionally, the polarization optical splitting unit 5401 may be a polarization optical splitter. Optionally, the N initial optical signals include at least two initial optical signals that each include a reference optical signal and a quantum optical signal of time division multiplexing; or the N initial optical signals include at least any two of the following: an initial optical signal that includes a reference optical signal and a quantum optical signal of time division multiplexing, an initial optical signal that includes the reference optical signal, or an initial optical signal that includes the quantum optical signal.

Optionally, for each of the N initial optical signals, the coherent coupling subunit 5402 is specifically configured to: when the N initial optical signals include at least one initial optical signal that includes the reference optical signal, use a local oscillator optical signal that accounts for a third proportion in a local oscillator optical signal to perform coherent coupling on the initial optical signal that includes the reference optical signal, so as to obtain a coherently coupled optical signal that includes the reference optical signal; when the N initial optical signals include at least one initial optical signal that includes the quantum optical signal, use a local oscillator optical signal that accounts for a fourth proportion in a local oscillator optical signal to perform coherent coupling on the initial optical signal that includes the quantum optical signal, so as to obtain a coherently coupled optical signal that includes the quantum optical signal; or when the N initial optical signals include at least one initial optical signal that includes the reference optical signal and the quantum optical signal of time division multiplexing, use a local oscillator optical signal that accounts for a fifth proportion in a local oscillator optical signal to perform coherent coupling and optical splitting processing on the initial optical signal that includes the reference optical signal and the quantum optical signal of time division multiplexing, so as to obtain two coherently coupled optical signals, where each of the two coherently coupled optical signals includes the reference optical signal and the quantum optical signal.

When the N initial optical signals include at least one initial optical signal that includes the reference optical signal and the quantum optical signal of time division multiplexing, there are a plurality of specific implementations. The following describes in detail the implementations by using the following Embodiment b1, Embodiment b2, and Embodiment b3.

Embodiment b1

The transmit optical signal is sent based on N polarization states, and in each polarization state, only the quantum optical signal or the reference optical signal is included. In this case, the polarization optical splitting unit 5401 is configured to split the transmit optical signal into N optical signals through polarization optical splitting processing, and perform polarization rotation on at least (N−1) optical signals to output N initial optical signals in a same polarization state, where each initial optical signal includes only the quantum optical signal or the reference optical signal.

Figure 5E:
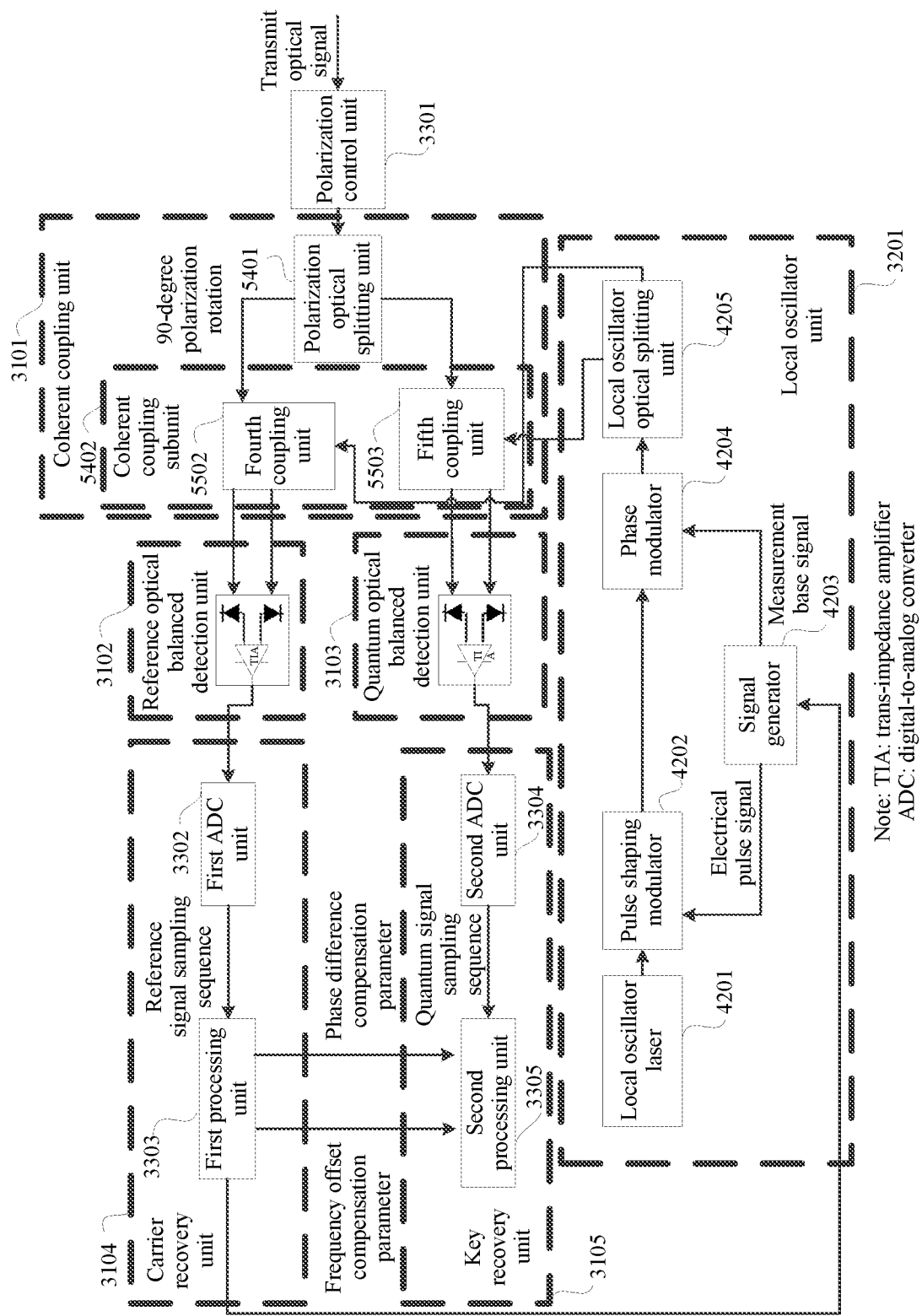
FIG. 5e is a schematic structural diagram of a still further original key recovery apparatus according to an embodiment of the present invention.

FIG. 5e shows an example of a schematic structural diagram of an original key recovery apparatus according to an embodiment of the present invention. A sending apparatus sends a transmit optical signal to a receiving apparatus based on two polarization states. A specific structure of the transmit optical signal is shown in FIG. 5b. A quantum optical signal is sent based on the polarization state X, and a reference optical signal is sent based on the polarization state Y. In this case, as shown in FIG. 5e, a coherent coupling unit 3101 includes a polarization optical splitting unit 5401 and a coherent coupling subunit 5402 connected to the polarization optical splitting unit 5401. The coherent coupling subunit 5402 includes a fourth coupling unit 5502 and a fifth coupling unit 5503. The fourth coupling unit 5502 and the fifth coupling unit 5503 each may be a 2:2 coupler. Two input ends of the fourth coupling unit 5502 are connected to the polarization optical splitting unit 5401 and a local oscillator unit 3201, respectively. Two output ends of the fourth coupling unit 5502 are separately connected to a reference optical balanced detection unit 3102. Two input ends of the fifth coupling unit 5503 are connected to the polarization optical splitting unit 5401 and the local oscillator unit 3201, respectively. Two output ends of the fifth coupling unit 5503 are separately connected to a quantum optical balanced detection unit 3103.

As shown in FIG. 5e, an internal structure of the local oscillator unit 3201 is the same as that of the local oscillator unit 3201 shown in FIG. 4b. For detailed content, refer to the foregoing content. In the local oscillator unit 3201, one end of a local oscillator optical splitting unit 4205 is connected to the phase modulator 4204, and the other ends thereof are connected to the fourth coupling unit 5502 and the fifth coupling unit 5503, respectively.

Based on the schematic structural diagram of the original key recovery apparatus shown in FIG. 5e, the following describes in detail a workflow of the original key recovery apparatus.

As shown in FIG. 5e, the sending apparatus transmits a transmit optical signal to the original key recovery apparatus through an optical fiber, the transmit optical signal first enters a polarization control unit 3301, and the polarization control unit 3301 inputs the transmit optical signal whose polarization state is fixed to the polarization optical splitting unit 5401.

The transmit optical signal is transmitted based on N polarization states, and the polarization optical splitting unit 5401 splits the transmit optical signal into N optical signals through polarization optical splitting processing, and performs polarization rotation on at least (N−1) optical signals to output N initial optical signals in a same polarization state, where one initial optical signal corresponds to one polarization state.

For example, for the transmit optical signal, if the quantum optical signal is transmitted based on the polarization state X and the reference optical signal is transmitted based on the polarization state Y, the polarization optical splitting unit 5401 outputs, through one output port, the quantum optical signal transmitted based on the polarization state X, rotates a polarization state of the reference optical signal transmitted based on the polarization state Y, by 90 degrees, that is, rotates to the polarization state X, and then outputs from another output port.

The polarization optical splitting unit 5401 inputs one initial optical signal that includes the reference optical signal to the fourth coupling unit 5502, and inputs one initial optical signal that includes the quantum optical signal to the fifth coupling unit 5503. The other input end of the fourth coupling unit 5502 and the other input end of the fifth coupling unit 5503 further receive a local oscillator optical signal that is input by the local oscillator unit 3201.

The coherent coupling subunit 5402 includes the fourth coupling unit 5502 and the fifth coupling unit 5503, and the fourth coupling unit 5502 and the fifth coupling unit 5503 separately need to perform a coherent coupling operation. Therefore, the fourth coupling unit 5502 and the fifth coupling unit 5503 both need the local oscillator optical signal. Based on this, the local oscillator optical splitting unit 4205 splits the received local oscillator optical signal into two third local oscillator optical sub-signals, and respectively sends the two third local oscillator optical sub-signals to the fourth coupling unit 5502 and the fifth coupling unit 5503.

The fourth coupling unit 5502 uses one of the two received third local oscillator optical sub-signals to perform coherent coupling on a received initial optical signal, so as to obtain one coherently coupled optical signal.

The fifth coupling unit 5503 is configured to use the other of the two received third local oscillator optical sub-signals to perform coherent coupling on the received initial optical signal, so as to obtain the other coherently coupled optical signal.

In this case, it can be learned that the transmit optical signal is transmitted based on two polarization states, only the reference optical signal or the quantum optical signal is transmitted based on each polarization state, the fourth coupling unit 5502 receives the reference optical signal transmitted based on the polarization state Y, and the fifth coupling unit 5503 receives the quantum optical signal transmitted based on the polarization state X. Therefore, the coherently coupled optical signal that is output by the fourth coupling unit 5502 includes only the reference optical signal, and the coherently coupled optical signal that is output by the fifth coupling unit 5503 includes only the quantum optical signal. In this case, the coherently coupled optical signal that is output by the fourth coupling unit 5502 is used as a first coherently coupled optical signal, and the coherently coupled optical signal that is output by the fifth coupling unit 5503 is used as a second coherently coupled optical signal.

The reference optical balanced detection unit 3102 receives the first coherently coupled optical signal that is output by the fourth coupling unit 5502. A specific processing procedure is described above. The quantum optical balanced detection unit 3103 receives the second coherently coupled optical signal that is output by the fifth coupling unit 5503. A specific processing procedure is described above. For a specific processing procedure of a carrier recovery unit 3104 and a key recovery unit 3105, refer to the foregoing description.

Embodiment b2

The transmit optical signal is sent based on N polarization states, and in a polarization state, the quantum optical signal and the reference optical signal of time division multiplexing are included. In this case, the polarization optical splitting unit is configured to: split the transmit optical signal into N optical signals through polarization optical splitting processing, and perform polarization rotation on at least (N−1) optical signals to output N initial optical signals in a same polarization state, where one initial optical signal includes the quantum optical signal and the reference optical signal of time division multiplexing.

Optionally, when the N initial optical signals include at least one initial optical signal that includes the reference optical signal and the quantum optical signal of time division multiplexing, the apparatus is specifically configured to: use a local oscillator optical signal that accounts for a fifth proportion in a local oscillator optical signal to perform coherent coupling on the initial optical signal that includes the reference optical signal and the quantum optical signal of time division multiplexing, and split a coherently coupled optical signal into two second coherent optical signals; and perform optical splitting processing on each of the two second coherent optical signals to obtain two second coherent optical signals that each account for a sixth proportion in each second coherent optical signal and two second coherent optical signals that each account for a seventh proportion in each second coherent optical signal. A sum of the sixth proportion and the seventh proportion is 1. The two second coherent optical signals that each account for the sixth proportion in each second coherent optical signal are used as one of the two coherently coupled optical signals, and the two second coherent optical signals that each account for the seventh proportion in each second coherent optical signal are used as the other of the two coherently coupled optical signals.

Figures 1, 5F:
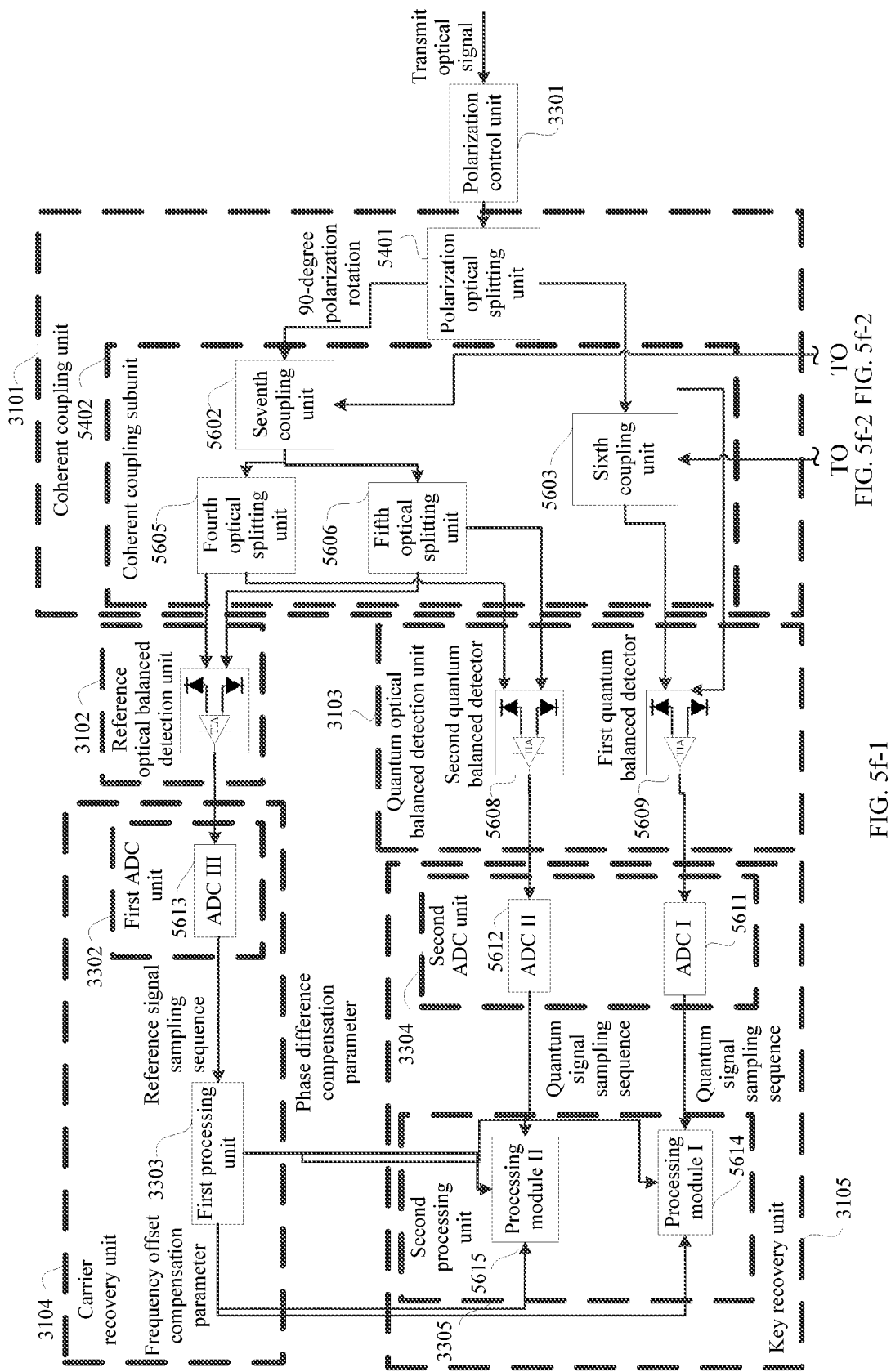
FIG. 5f-1 and FIG. 5f-2 are a schematic structural diagram of a yet further original key recovery apparatus according to an embodiment of the present invention.
Figures 2, 5F:
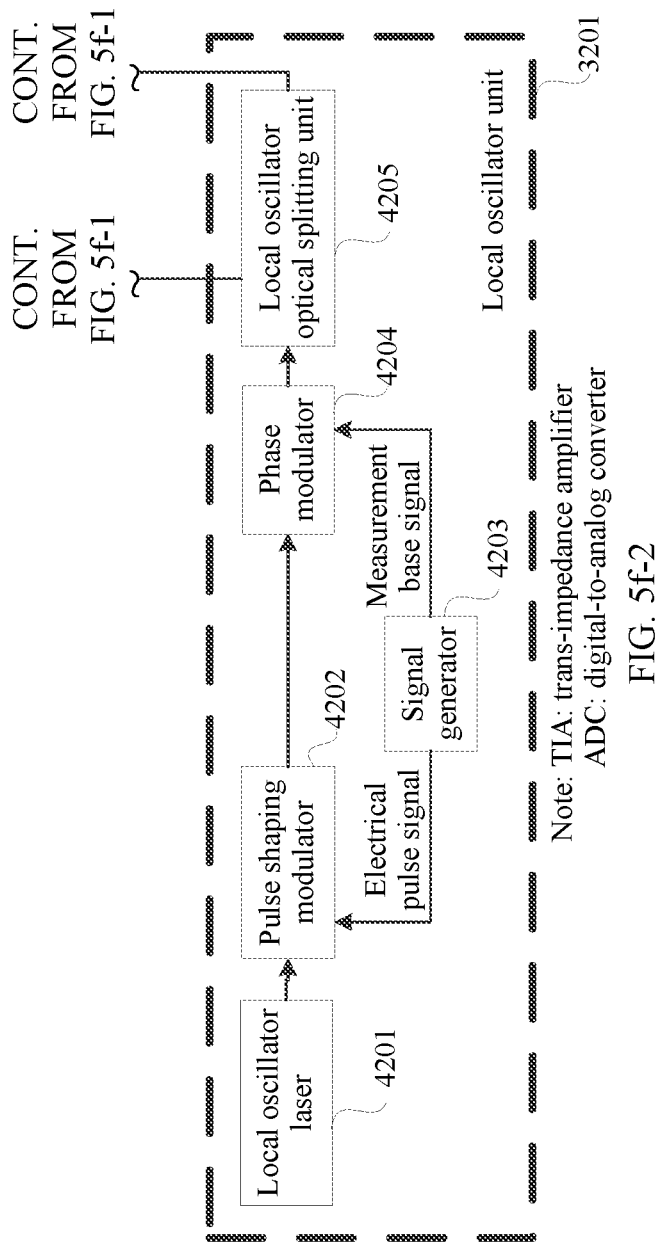

To describe Embodiment b2 more clearly, the following provides description with reference to FIG. 5*f*-1 and FIG. 5*f*-2. FIG. 5*f*-1 and FIG. 5*f*-2 show an example of a schematic structural diagram of an original key recovery apparatus according to an embodiment of the present invention. A sending apparatus sends a transmit optical signal to a receiving apparatus based on two polarization states. A specific structure of the transmit optical signal is shown in FIG. 5*c*. The quantum optical signal is sent based on the polarization state X, and the reference optical signal and the quantum optical signal of time division multiplexing are sent based on the polarization state Y. In this case, as shown in FIG. 5*f*-1 and FIG. 5*f*-2, a coherent coupling unit 3101 includes a polarization optical splitting unit 5401 and a coherent coupling subunit 5402 connected to the polarization optical splitting unit 5401, the coherent coupling subunit 5402 includes a sixth coupling unit 5603 and a seventh coupling unit 5602, and the sixth coupling unit 5603 and the seventh coupling unit 5602 each may be a 2:2 coupler. Two input ends of the sixth coupling unit 5603 are connected to the polarization optical splitting unit 5401 and a local oscillator unit 3201, respectively; and two output ends of the sixth coupling unit 5603 are separately connected to a quantum optical balanced detection unit 3103.

Specifically, in this embodiment of the present invention, a reference optical balanced detection unit 3102 may include one or more reference optical balanced detectors, and the quantum optical balanced detection unit 3103 may include one or more quantum optical balanced detectors. Each reference optical balanced detector in the reference optical balanced detection unit 3102 correspondingly detects one first coherently coupled optical signal. To be specific, each reference optical balanced detector in the reference optical balanced detection unit 3102 performs optical-to-electrical conversion and amplification on one first coherently coupled optical signal. Each quantum optical balanced detector in the quantum optical balanced detection unit 3103 correspondingly detects one second coherently coupled optical signal. To be specific, each quantum optical balanced detector in the quantum optical balanced detection unit 3103 performs optical-to-electrical conversion and amplification on one second coherently coupled optical signal.

As shown in FIG. 5*f*-1 and FIG. 5*f*-2, the quantum optical balanced detection unit 3103 includes a first quantum optical balanced detector 5609 and a second quantum optical balanced detector 5608. Then two output ends of the sixth coupling unit 5603 are connected to two input ends of the first quantum optical balanced detector 5609, respectively. Two input ends of the seventh coupling unit 5602 are connected to the polarization optical splitting unit 5401 and the local oscillator unit 3201, respectively. Two output ends of the seventh coupling unit 5602 are connected to a fourth optical splitting unit 5605 and a fifth optical splitting unit 5606, respectively. Two output ends of the fourth optical splitting unit 5605 are connected to the reference optical balanced detection unit 3102 and the second quantum optical balanced detector 5608, respectively. Two output ends of the fifth optical splitting unit 5606 are connected to the reference optical balanced detection unit 3102 and the second quantum optical balanced detector 5608, respectively.

Further, a quantity of reference optical balanced detectors included in each reference optical balanced detection unit 3102 is the same as a quantity of ADCs included in a first ADC unit 3302. In other words, one reference optical balanced detector is connected to one ADC in the first ADC unit 3302. Likewise, a quantity of quantum optical balanced detectors included in each quantum optical balanced detection unit 3103 is the same as a quantity of ADCs included in a second ADC unit 3304. In other words, one quantum optical balanced detector is connected to one ADC in the second ADC unit 3304.

As shown in FIG. 5*f*-1 and FIG. 5*f*-2, the first quantum optical balanced detector 5609 is connected to an ADC I 5611 in the second ADC unit 3304, and the second quantum optical balanced detector 5608 is connected to an ADC II 5612 in the second ADC unit 3304. The reference optical balanced detection unit 3102 is connected to an ADC III 5613 in the first ADC unit 3302. The ADC I 5611 and the ADC II 5612 are connected to a second processing unit 3305 in a key recovery unit 3105, the second processing unit 3305 or a first processing unit 3303 may include one or more processing modules, and one ADC corresponds to one processing module. For example, the ADC 15611 corresponds to a processing module I 5614 in the second processing unit 3305, and the ADC II 5612 corresponds to a processing module II 5615 in the second processing unit 3305. The ADC III 5613 is connected to the first processing unit 3303 in a carrier recovery unit 3104. One end of a local oscillator optical splitting unit 4205 is connected to a phase modulator 4204, and the other ends thereof are connected to the sixth coupling unit 5603 and the seventh coupling unit 5602, respectively.

Based on the schematic structural diagram of the original key recovery apparatus shown in FIG. 5*f*-1 and FIG. 5*f*-2, the following describes in detail a workflow of the original key recovery apparatus.

As shown in FIG. 5*f*-1 and FIG. 5*f*-2, the sending apparatus transmits a transmit optical signal to the original key recovery apparatus through an optical fiber, the transmit optical signal first enters the polarization control unit 3301, and the polarization control unit 3301 inputs the transmit optical signal whose polarization state is fixed to the polarization optical splitting unit 5401. The transmit optical signal is transmitted based on N polarization states, and the polarization optical splitting unit 5401 outputs N initial optical signals in a same polarization state, where one initial optical signal corresponds to one polarization state.

The polarization optical splitting unit 5401 inputs one initial optical signal that includes the reference optical signal to the sixth coupling unit 5603, and inputs one initial optical signal that includes the reference optical signal and the quantum optical signal of time division multiplexing to the seventh coupling unit 5602. The other input end of the sixth coupling unit 5603 and the other input end of the seventh coupling unit 5602 further receive the local oscillator optical signal that is input by the local oscillator unit 3201.

As shown in FIG. 5*f*-1 and FIG. 5*f*-2, an internal structure of the local oscillator unit 3201 is the same as that of the local oscillator unit 3201 shown in FIG. 4*b*. For detailed content, refer to the foregoing content. The coherent coupling subunit 5402 includes the sixth coupling unit 5603 and the seventh coupling unit 5602, and the sixth coupling unit 5603 and the seventh coupling unit 5602 separately need to perform a coherent coupling operation. Therefore, the sixth coupling unit 5603 and the seventh coupling unit 5602 both need the local oscillator optical signal. Based on this, the local oscillator optical splitting unit 4205 splits the received local oscillator optical signal into two fourth local oscillator optical sub-signals, and respectively inputs the two fourth local oscillator optical sub-signals to the sixth coupling unit 5603 and the seventh coupling unit 5602.

The sixth coupling unit 5603 uses one of the two received fourth local oscillator optical sub-signals to perform coherent coupling on the received initial optical signal, so as to obtain one coherently coupled optical signal.

The seventh coupling unit 5602 uses one of the two received fourth local oscillator optical sub-signals to perform coherent coupling on the received initial optical signal, so as to obtain the other coherently coupled optical signal. The seventh coupling unit 5602 respectively sends the two second coherent optical signals to the fourth optical splitting unit 5605 and the fifth optical splitting unit 5606.

The fourth optical splitting unit 5605 performs optical splitting processing on one of the two received second coherent optical signals to obtain a second coherent optical signal that accounts for a sixth proportion in the second coherent optical signal and a second coherent optical signal that accounts for a seventh proportion in the second coherent optical signal, where a sum of the sixth proportion and the seventh proportion is 1.

The fifth optical splitting unit 5606 performs optical splitting processing on the other of the two received second coherent optical signals to obtain a second coherent optical signal that accounts for the sixth proportion in the second coherent optical signal and a second coherent optical signal that accounts for the seventh proportion in the second coherent optical signal.

The two second coherent optical signals that each account for the sixth proportion in each second coherent optical signal are used as one of the two coherently coupled optical signals, and the two second coherent optical signals that each account for the seventh proportion in each second coherent optical signal are used as the other of the two coherently coupled optical signals.

For example, the sixth proportion is 10%, and the seventh proportion is 90%. The fourth optical splitting unit 5605 splits one received second coherent optical signal into a second coherent optical signal that accounts for 10% and a second coherent optical signal that accounts for 90%. The fifth optical splitting unit 5606 splits the other received second coherent optical signal into a second coherent optical signal that accounts for 10% and a second coherent optical signal that accounts for 90%. The fourth optical splitting unit 5605 inputs the second coherent optical signal that accounts for 10% to the reference optical balanced detection unit 3102, and the fifth optical splitting unit 5606 inputs the second coherent optical signal that accounts for 10% to the reference optical balanced detection unit 3102. The fourth optical splitting unit 5605 inputs the second coherent optical signal that accounts for 90% to the quantum optical balanced detection unit 3103, and the fifth optical splitting unit 5606 inputs the second coherent optical signal that accounts for 90% to the quantum optical balanced detection unit 3103. In other words, the two second coherent optical signals that each account for 10% are one coherently coupled optical signal, and the two second coherent optical signals that each account for 90% are the other coherently coupled optical signal. The first coherently coupled optical signal may be the two second coherent optical signals that each account for 10%, and the second coherently coupled optical signal may be the two second coherent optical signals that each account for 90%.

Further, the two second coherent optical signals that each account for 10% are one coherently coupled optical signal and enter the reference optical balanced detection unit 3102, and the two second coherent optical signals that each account for 90% are one coherently coupled optical signal and enter the second quantum optical balanced detector 5608 in the quantum optical balanced detection unit 3103.

In this embodiment of the present invention, specific values of the sixth proportion and the seventh proportion are not limited. Optionally, the quantum optical signal is an extremely weak optical signal, and an insertion loss value on an entire transmission link severely affects a transmission distance of the quantum optical signal. Therefore, preferably, on the premise that after optical-to-electrical conversion and amplification are performed on the reference optical signal, normal sampling can be ensured and accurate phase frequency information can be recovered, an intensity proportion of light that is input to the quantum optical balanced detection unit 3103 can be improved as large as possible.

In this case, it can be learned that the transmit optical signal is transmitted based on two polarization states, and an optical signal that enters the sixth coupling unit 5603 includes only the quantum optical signal. Therefore, a coherently coupled optical signal that is output by the sixth coupling unit 5603 includes only the quantum optical signal. Therefore, the coherently coupled optical signal that is output by the sixth coupling unit 5603 is the first coherently coupled optical signal. An optical signal that enters the seventh coupling unit 5602 includes the quantum optical signal and the reference optical signal of time division multiplexing. Therefore, each of the two second coherent optical signals that are output by the seventh coupling unit 5602 includes the reference optical signal and the quantum optical signal of time division multiplexing. Then through optical splitting processing by the fourth optical splitting unit 5605 and the fifth optical splitting unit 5606, each of the two obtained coherently coupled optical signals includes the reference optical signal and the quantum optical signal of time division multiplexing. In this case, one of the two coherently coupled optical signals obtained through optical splitting processing by the fourth optical splitting unit 5605 and the fifth optical splitting unit 5606 is used as the first coherently coupled optical signal, and the other is used as the second coherently coupled optical signal.

The reference optical balanced detection unit 3102 receives the first coherently coupled optical signal that is output by the fourth optical splitting unit 5605 and the fifth optical splitting unit 5606. A specific processing procedure is described above.

The quantum optical balanced detection unit 3103 includes the first quantum optical balanced detector 5609 and the second quantum optical balanced detector 5608.

The first quantum optical balanced detector 5609 receives the second coherently coupled optical signal that is output by the sixth coupling unit 5603, and performs optical-to-electrical conversion and amplification on the received second coherently coupled optical signal, so as to ensure that an amplitude of an output second electrical signal is in a second preset amplitude range of the second ADC unit 3304.

The second quantum optical balanced detector 5608 receives the second coherently coupled optical signal that is output by the fourth optical splitting unit 5605 and the fifth optical splitting unit 5606, and performs optical-to-electrical conversion and amplification on the received second coherently coupled optical signal, so as to ensure that an amplitude of an output second electrical signal is in the second preset amplitude range of the second ADC unit 3304.

The ADC III 5613 in the first ADC unit receives a first electrical signal that is output by the reference optical balanced detection unit, performs sampling quantization on the received first electrical signal, and outputs a reference signal sampling sequence to the first processing unit 3303 in the carrier recovery unit, so that the first processing unit 3303 determines phase frequency information between the local oscillator optical signal and the reference optical signal from the reference signal sampling sequence.

The second ADC unit 3304 includes the ADC I 5611 and the ADC II 5612, the ADC I 5611 is connected to the first quantum optical balanced detector 5609, and the ADC II 5612 is connected to the second quantum optical balanced detector 5608.

The ADC I 5611 receives the second electrical signal that is output by the first quantum optical balanced detector 5609, performs sampling quantization on the received second electrical signal, and outputs a quantum signal sampling sequence to the processing module I 5614.

The ADC II 5612 receives the second electrical signal that is output by the second quantum optical balanced detector

5608, performs sampling quantization on the received second electrical signal, and outputs a quantum signal sampling sequence to the processing module II 5615. The processing module I 5614 and the processing module II 5615 recover an original key from the quantum signal sampling sequence based on received phase frequency information.

Embodiment b3

Optionally, when the N initial optical signals include at least one initial optical signal that includes the reference optical signal and the quantum optical signal of time division multiplexing, the local oscillator unit is specifically configured to split the local oscillator optical signal that accounts for the fifth proportion in the local oscillator optical signal into two second local oscillator optical sub-signals, and send the two second local oscillator optical sub-signals to the coherent coupling subunit. The coherent coupling subunit is specifically configured to perform optical splitting processing on the initial optical signal that includes the reference optical signal and the quantum optical signal of time division multiplexing, to obtain two optically split initial optical signals, and use the two received second local oscillator optical sub-signals to respectively perform coherent coupling on each of the two optically split initial optical signals, so as to obtain two of the at least two coherently coupled optical signals, where one local oscillator optical signal corresponds to one optically split initial optical signal.

Figures 1, 5G:
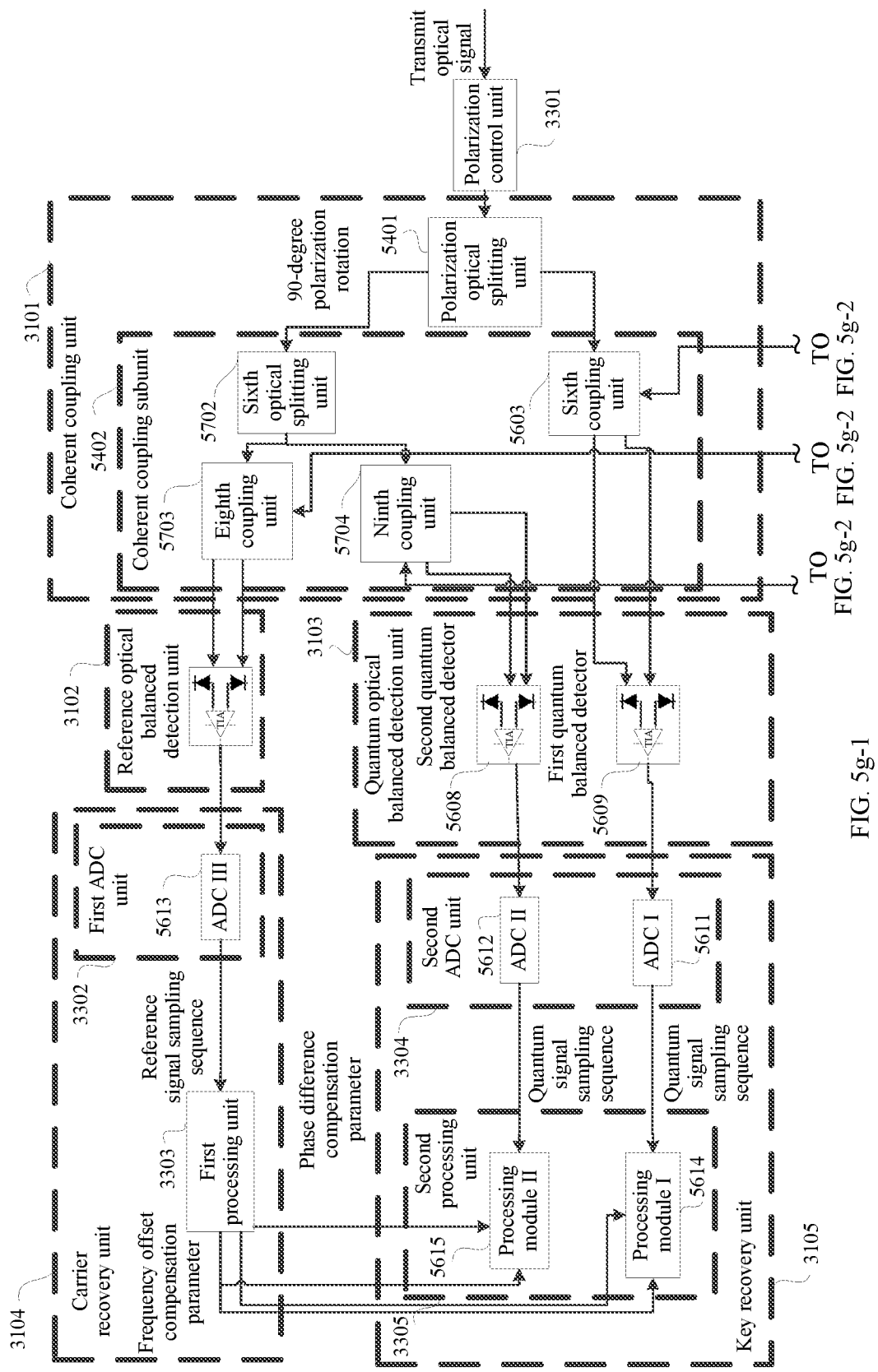
Figures 2, 5G:
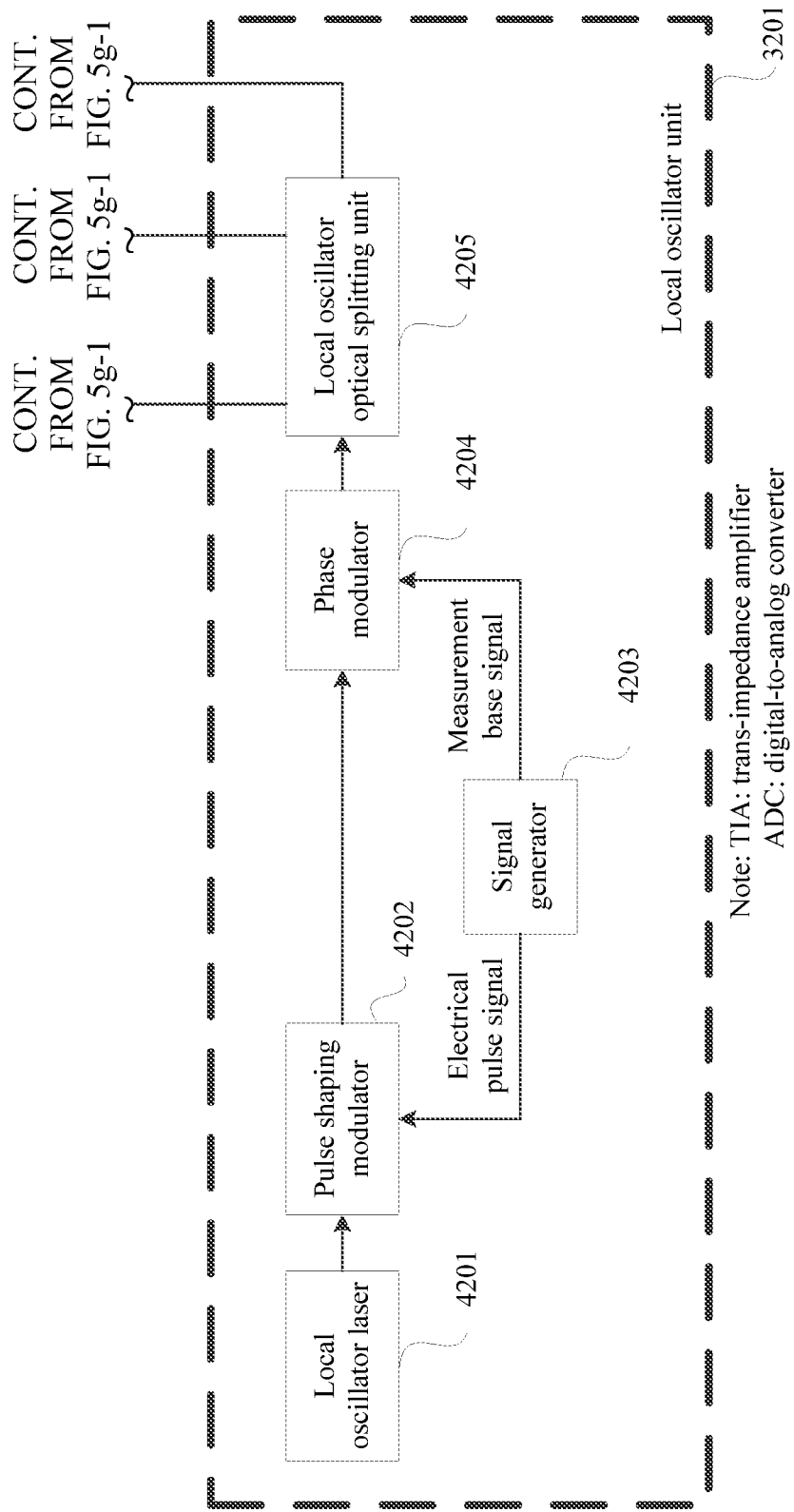

To describe Embodiment b3 more clearly, the following provides description with reference to FIG. 5g-1 and FIG. 5g-2. FIG. 5g-1 and FIG. 5g-2 show an example of a schematic structural diagram of an original key recovery apparatus according to an embodiment of the present invention. A sending apparatus sends a transmit optical signal to a receiving apparatus based on two polarization states. A specific structure of the transmit optical signal is shown in FIG. 5c. The quantum optical signal is sent based on the polarization state X, and the reference optical signal and the quantum optical signal of time division multiplexing are sent based on the polarization state Y. As shown in FIG. 5g-1 and FIG. 5g-2, a coherent coupling unit 3101 includes a polarization optical splitting unit 5401 and a coherent coupling subunit 5402 connected to the polarization optical splitting unit 5401, the coherent coupling subunit 5402 includes a sixth coupling unit 5603, a sixth optical splitting unit 5702, an eighth coupling unit 5703, and a ninth coupling unit 5704, and the sixth coupling unit 5603, the eighth coupling unit 5703, and the ninth coupling unit 5704 each may be a 2:2 coupler. Two input ends of the sixth coupling unit 5603 are connected to the polarization optical splitting unit 5401 and a local oscillator unit 3201, respectively. Two output ends of the sixth coupling unit 5603 are separately connected to a quantum optical balanced detection unit 3103.

As shown in FIG. 5g-1 and FIG. 5g-2, the quantum optical balanced detection unit 3103 includes a first quantum optical balanced detector 5609 and a second quantum optical balanced detector 5608. Further, the two output ends of the sixth coupler 5603 are connected to two input ends of the first quantum optical balanced detector 5609, respectively. An input end of the sixth optical splitting unit 5702 is connected to the polarization optical splitting unit 5401, and two output ends of the sixth optical splitting unit 5702 are connected to the eighth coupling unit 5703 and the ninth coupling unit 5704, respectively.

Two input ends of the eighth coupling unit 5703 are connected to the sixth optical splitting unit 5702 and the local oscillator unit 3201, respectively. Two output ends of the eighth coupling unit 5703 are separately connected to the reference optical balanced detection unit 3102. Two input ends of the ninth coupling unit 5704 are connected to the sixth optical splitting unit 5702 and the local oscillator unit 3201, respectively. Two output ends of the ninth coupling unit 5704 are separately connected to the second quantum optical balanced detector 5608 in the quantum optical balanced detection unit 3103.

As shown in FIG. 5g, an internal structure of the local oscillator unit 3201 is the same as that of the local oscillator unit 3201 shown in FIG. 4b. For detailed content, refer to the foregoing content. One end of a local oscillator optical splitting unit 4205 is connected to a phase modulator 4204, and the other ends thereof are connected to the sixth coupling unit 5603, the eighth coupling unit 5703, and the ninth coupling unit 5704, respectively. The local oscillator optical splitting unit 4205 may be an optical splitter.

Based on the schematic structural diagram of the original key recovery apparatus shown in FIG. 5g-1 and FIG. 5g-2, the following describes in detail a workflow of the original key recovery apparatus.

As shown in FIG. 5g-1 and FIG. 5g-2, the sending apparatus transmits a transmit optical signal to the original key recovery apparatus through an optical fiber, the transmit optical signal first enters a polarization control unit 3301, and the polarization control unit 3301 inputs the transmit optical signal whose polarization state is fixed to the polarization optical splitting unit 5401. The transmit optical signal is transmitted based on N polarization states, and the polarization optical splitting unit 5401 outputs N initial optical signals in a same polarization state.

Specifically, the polarization optical splitting unit 5401 inputs one initial optical signal that includes the quantum optical signal to the sixth coupling unit 5603, and inputs one initial optical signal that includes the reference optical signal and the quantum optical signal of time division multiplexing to the sixth optical splitting unit 5702. The sixth optical splitting unit 5702 performs optical splitting processing on the received initial optical signal that includes the quantum optical signal to obtain two optically split initial optical signals, and respectively outputs the two optically split initial optical signals to the eighth coupling unit 5703 and the ninth coupling unit. The other input end of the sixth coupling unit 5603, the other input end of the eighth coupling unit 5703, and the other input end of the ninth coupling unit further receive a local oscillator optical signal that is input by the local oscillator unit 3201, and then any one of the sixth coupling unit 5603, the eighth coupling unit 5703, or the ninth coupling unit uses one received local oscillator optical signal to perform coherent coupling on the received optically split initial optical signal, so as to obtain one coherently coupled optical signal.

In this case, the local oscillator unit 3201 splits a local oscillator optical signal that accounts for a fifth proportion in the local oscillator optical signal into two second local oscillator optical sub-signals, and sends the two second local oscillator optical sub-signals to the eighth coupling unit 5703 and the ninth coupling unit, respectively.

The coherent coupling subunit 5402 includes the sixth coupling unit 5603, the eighth coupling unit 5703, and the ninth coupling unit, and the sixth coupling unit 5603, the eighth coupling unit 5703, and the ninth coupling unit each need to perform a coherent coupling operation. Therefore, the sixth coupling unit 5603, the eighth coupling unit 5703, and the ninth coupling unit all need the local oscillator optical signal. Based on this, the local oscillator optical splitting unit 4205 splits the received local oscillator optical signal into three signals.

The sixth coupling unit 5603 uses one local oscillator optical signal to perform coherent coupling on the received initial optical signal, so as to obtain one coherently coupled optical signal.

The eighth coupling unit 5703 uses one local oscillator optical signal to perform coherent coupling on the received initial optical signal, so as to obtain one coherently coupled optical signal.

The ninth coupling unit uses one local oscillator optical signal to perform coherent coupling on the received initial optical signal, so as to obtain one coherently coupled optical signal.

In this case, it can be learned that the transmit optical signal is transmitted based on two polarization states, and an optical signal that enters the sixth coupling unit 5603 includes only the quantum optical signal. Therefore, a coherently coupled optical signal that is output by the sixth coupling unit 5603 includes only the quantum optical signal. Therefore, the coherently coupled optical signal that is output by the sixth coupling unit 5603 is a first coherently coupled optical signal. An optical signal that enters the sixth optical splitting unit 5702 includes the quantum optical signal and the reference optical signal of time division multiplexing. Therefore, optically split initial optical signals that are output to the eighth coupling unit 5703 and the ninth coupling unit by the sixth optical splitting unit 5702 each include the reference optical signal and the quantum optical signal of time division multiplexing. Then through coherent coupling processing by the eighth coupling unit 5703 and the ninth coupling unit, each of the two obtained coherently coupled optical signals includes the reference optical signal and the quantum optical signal of time division multiplexing. In this case, one of the two coherently coupled optical signals is used as the first coherently coupled optical signal, and the other is used as a second coherently coupled optical signal.

The reference optical balanced detection unit 3102 receives the first coherently coupled optical signal that is output by the eighth coupling unit 5703. A specific processing procedure is described above. The quantum optical balanced detection unit 3103 receives the second coherently coupled optical signal that is output by the ninth coupling unit 5704. A specific processing procedure is described above. For a specific processing procedure of a carrier recovery unit 3104 and a key recovery unit 3105, refer to the foregoing description.

It can be learned from the foregoing content that, in this embodiment of the present invention, the transmit optical signal includes the reference optical signal and the quantum optical signal, optical splitting processing and coherent coupling are performed on the transmit optical signal using the local oscillator optical signal to obtain the at least two coherently coupled optical signals, and then optical-to-electrical conversion and amplification are separately performed on the first coherently coupled optical signal that includes the reference optical signal and the second coherently coupled optical signal that includes the quantum optical signal, to obtain a first electrical signal and a second electrical signal. Then, phase frequency information between the local oscillator optical signal and the reference optical signal is obtained from the first electrical signal, and an original key is recovered from the second electrical signal based on the phase frequency information. It can be learned that this solution requires no strict equal-length control on a length difference between two optical fibers of a sending apparatus and a receiving apparatus, thereby reducing technical difficulty.

Figure 6A:
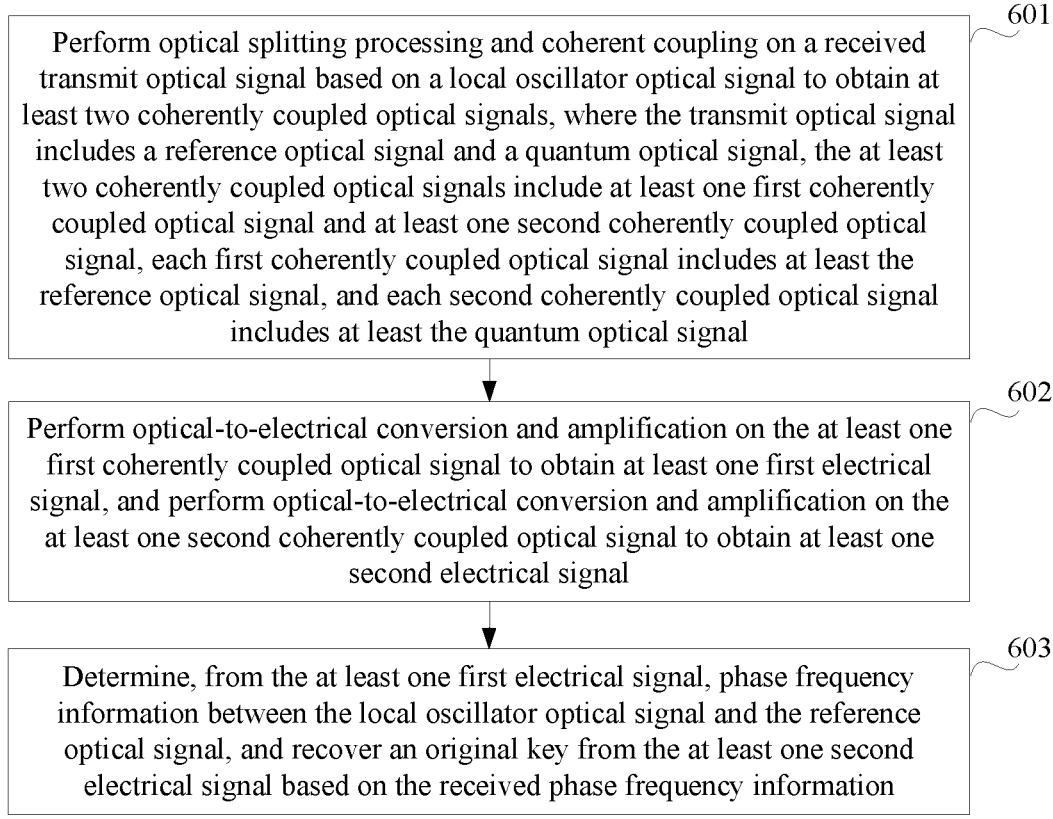
FIG. 6a is a schematic flowchart of an original key recovery method according to an embodiment of the present invention.

FIG. 6a shows an example of a schematic flowchart of an original key recovery method according to an embodiment of the present invention.

Based on a same idea, as shown in FIG. 6a, an original key recovery method provided in this embodiment of the present invention includes the following steps.

Step 601: Perform optical splitting processing and coherent coupling on a received transmit optical signal based on a local oscillator optical signal to obtain at least two coherently coupled optical signals, where the transmit optical signal includes a reference optical signal and a quantum optical signal, the at least two coherently coupled optical signals include at least one first coherently coupled optical signal and at least one second coherently coupled optical signal, each first coherently coupled optical signal includes at least the reference optical signal, and each second coherently coupled optical signal includes at least the quantum optical signal.

Step 602: Perform optical-to-electrical conversion and amplification on the at least one first coherently coupled optical signal to obtain at least one first electrical signal, and perform optical-to-electrical conversion and amplification on the at least one second coherently coupled optical signal to obtain at least one second electrical signal.

Step 603: Determine, from the at least one first electrical signal, phase frequency information between the local oscillator optical signal and the reference optical signal, and recover an original key from the at least one second electrical signal based on the received phase frequency information.

Optionally, an amplification factor used during the optical-to-electrical conversion and amplification performed on the at least one first coherently coupled optical signal is less than that used during the optical-to-electrical conversion and amplification performed on the at least one second coherently coupled optical signal.

Optionally, bandwidth of a balanced detection receiver that performs optical-to-electrical conversion and amplification on the at least one first coherently coupled optical signal is higher than that of a balanced detection receiver that performs optical-to-electrical conversion and amplification on the at least one second coherently coupled optical signal, and a gain of the balanced detection receiver that performs optical-to-electrical conversion and amplification on the at least one first coherently coupled optical signal is lower than that of the balanced detection receiver that performs optical-to-electrical conversion and amplification on the at least one second coherently coupled optical signal.

In this embodiment of the present invention, the first coherently coupled optical signal and the second coherently coupled optical signal may be separately amplified. In this case, an amplification factor corresponding to the first coherently coupled optical signal is adjusted to a smaller value, so that the phase frequency information between the local oscillator optical signal and the reference optical signal is determined from the first electrical signal. An amplification factor corresponding to the second coherently coupled optical signal is adjusted to a larger value, so that the original key is recovered from the at least one second electrical signal. Therefore, the phase frequency information can be recovered from the reference optical signal more accurately based on the first coherently coupled optical signal, and the original key can also be recovered from the quantum optical signal more accurately based on the second coherently coupled optical signal.

Optionally, before the performing optical splitting processing and coherent coupling on a received transmit optical signal based on a local oscillator optical signal to obtain at least two coherently coupled optical signals, the method further includes generating the local oscillator optical signal based on the phase frequency information.

Optionally, if the transmit optical signal is transmitted based on one polarization state, the transmit optical signal includes a reference optical signal and a quantum optical signal of time division multiplexing. The performing optical splitting processing and coherent coupling on a received transmit optical signal based on a local oscillator optical signal to obtain at least two coherently coupled optical signals includes: receiving the transmit optical signal, and performing optical splitting processing on the transmit optical signal to obtain two optically split optical signals; and splitting the local oscillator optical signal into two first local oscillator optical sub-signals, and using the two first local oscillator optical sub-signals to respectively perform coherent coupling on the two optically split optical signals, so as to obtain the at least two coherently coupled optical signals, where one first local oscillator optical sub-signal corresponds to one optically split optical signal.

Optionally, if the transmit optical signal is transmitted based on one polarization state, the transmit optical signal includes a reference optical signal and a quantum optical signal of time division multiplexing. The performing optical splitting processing and coherent coupling on a received transmit optical signal based on a local oscillator optical signal to obtain at least two coherently coupled optical signals includes: using the local oscillator optical signal to perform coherent coupling on the transmit optical signal, and splitting a coherently coupled optical signal into two first coherent optical signals; performing optical splitting processing on one of the two received first coherent optical signals, to obtain a first coherent optical signal that accounts for a first proportion in the first coherent optical signal and a first coherent optical signal that accounts for a second proportion in the first coherent optical signal, where a sum of the first proportion and the second proportion is 1; and performing optical splitting processing on the other of the two received first coherent optical signals, to obtain a first coherent optical signal that accounts for the first proportion in the first coherent optical signal and a first coherent optical signal that accounts for the second proportion in the first coherent optical signal. The two first coherent optical signals that each account for the first proportion in each first coherent optical signal are used as one of the two coherently coupled optical signals, and the two first coherent optical signals that each account for the second proportion in each first coherent optical signal are used as the other of the two coherently coupled optical signals.

Optionally, if the transmit optical signal is transmitted based on N polarization states, and N is an integer greater than 1, the performing optical splitting processing and coherent coupling on a received transmit optical signal based on a local oscillator optical signal to obtain at least two coherently coupled optical signals includes: splitting the transmit optical signal into N optical signals through polarization optical splitting processing, and performing polarization rotation on at least (N−1) optical signals to output N initial optical signals in a same polarization state, where one initial optical signal corresponds to one polarization state; and performing at least coherent coupling on each of the N initial optical signals based on the received local oscillator optical signal, to output at least N coherently coupled optical signals.

Optionally, the N initial optical signals include at least two initial optical signals that each include a reference optical signal and a quantum optical signal of time division multiplexing; or the N initial optical signals include at least any two of the following: an initial optical signal that includes a reference optical signal and a quantum optical signal of time division multiplexing, an initial optical signal that includes the reference optical signal, or an initial optical signal that includes the quantum optical signal.

Optionally, the performing at least coherent coupling on each of the N initial optical signals based on the received local oscillator optical signal, to output at least N coherently coupled optical signals includes: when the N initial optical signals include at least one initial optical signal that includes the reference optical signal, using a local oscillator optical signal that accounts for a third proportion in the local oscillator optical signal to perform coherent coupling on the initial optical signal that includes the reference optical signal, so as to obtain a coherently coupled optical signal that includes the reference optical signal; when the N initial optical signals include at least one initial optical signal that includes the quantum optical signal, using a local oscillator optical signal that accounts for a fourth proportion in the local oscillator optical signal to perform coherent coupling on the initial optical signal that includes the quantum optical signal, so as to obtain a coherently coupled optical signal that includes the quantum optical signal; or when the N initial optical signals include at least one initial optical signal that includes the reference optical signal and the quantum optical signal of time division multiplexing, using a local oscillator optical signal that accounts for a fifth proportion in the local oscillator optical signal to perform coherent coupling and optical splitting processing on the initial optical signal that includes the reference optical signal and the quantum optical signal of time division multiplexing, so as to obtain two coherently coupled optical signals, where each of the two coherently coupled optical signals includes the reference optical signal and the quantum optical signal.

Optionally, the using a local oscillator optical signal that accounts for a fifth proportion in the local oscillator optical signal to perform coherent coupling and optical splitting processing on the initial optical signal that includes the reference optical signal and the quantum optical signal of time division multiplexing, so as to obtain two coherently coupled optical signals includes: performing optical splitting processing on the initial optical signal that includes the reference optical signal and the quantum optical signal of time division multiplexing, to obtain two optically split initial optical signals; and splitting the local oscillator optical signal that accounts for the fifth proportion in the local oscillator optical signal into two second local oscillator optical sub-signals; and using the two second local oscillator optical sub-signals to respectively perform coherent coupling on each of the two optically split initial optical signals, so as to obtain two of the at least two coherently coupled optical signals, where one local oscillator optical signal corresponds to one optically split initial optical signal.

Optionally, the using a local oscillator optical signal that accounts for a fifth proportion in the local oscillator optical signal to perform coherent coupling and optical splitting processing on the initial optical signal that includes the reference optical signal and the quantum optical signal of time division multiplexing, so as to obtain two coherently coupled optical signals includes: using the local oscillator optical signal that accounts for the fifth proportion in the local oscillator optical signal to perform coherent coupling on the initial optical signal that includes the reference optical signal and the quantum optical signal of time division multiplexing, and splitting a coherently coupled optical signal into two second coherent optical signals; and performing optical splitting processing on each of the two second coherent optical signals to obtain two second coherent optical signals that each account for a sixth proportion in each second coherent optical signal and two second coherent optical signals that each account for a seventh proportion in each second coherent optical signal, where a sum of the sixth proportion and the seventh proportion is 1. The two second coherent optical signals that each account for the sixth proportion in each second coherent optical signal are used as one of the two coherently coupled optical signals, and the two second coherent optical signals that each account for the seventh proportion in each second coherent optical signal are used as the other of the two coherently coupled optical signals.

Optionally, the determining, from the at least one first electrical signal, phase frequency information between the local oscillator optical signal and the reference optical signal includes: receiving the at least one first electrical signal, and performing sampling quantization on each of the at least one first electrical signal to obtain a reference signal sampling sequence, where an electrical signal amplitude that is in a corresponding first electrical signal and that corresponds to the reference optical signal included in each first coherently coupled optical signal is in a first preset amplitude range; and determining the phase frequency information between the local oscillator optical signal and the reference optical signal based on the received reference signal sampling sequence.

Optionally, the recovering an original key from the at least one second electrical signal based on the received phase frequency information includes: receiving the at least one second electrical signal, and performing sampling quantization on each of the at least one second electrical signal to obtain a quantum signal sampling sequence, where an electrical signal amplitude that is in a corresponding second electrical signal and that corresponds to the quantum optical signal included in each second coherently coupled optical signal is in a second preset amplitude range; and recovering the original key based on the received quantum signal sampling sequence and the received phase frequency information.

Optionally, before the performing optical splitting processing and coherent coupling on a received transmit optical signal based on a local oscillator optical signal to obtain at least two coherently coupled optical signals, the method further includes: receiving the transmit optical signal, and adjusting a polarization state of the received transmit optical signal to a fixed polarization state.

Optionally, the local oscillator optical signal includes a first local oscillator optical signal used to fit the reference optical signal in the transmit optical signal, and a second local oscillator optical signal used to fit the quantum optical signal in the transmit optical signal; and a phase of the first local oscillator optical signal is one of preset fixed phase values, and a phase of the second local oscillator optical signal is a random value of the preset fixed phase values.

It can be learned from the foregoing content that, in this embodiment of the present invention, the transmit optical signal includes the reference optical signal and the quantum optical signal, optical splitting processing and coherent coupling are performed on the transmit optical signal using the local oscillator optical signal to obtain the at least two coherently coupled optical signals, and then optical-to-electrical conversion and amplification are separately performed on the first coherently coupled optical signal that includes the reference optical signal and the second coherently coupled optical signal that includes the quantum optical signal, to obtain the first electrical signal and the second electrical signal. Then, the phase frequency information between the local oscillator optical signal and the reference optical signal is obtained from the first electrical signal, and the original key is recovered from the second electrical signal based on the phase frequency information. It can be learned that this solution requires no strict equal-length control on a length difference between two optical fibers of a sending apparatus and a receiving apparatus, thereby reducing technical difficulty.

A person skilled in the art should understand that the embodiments of the present invention may be provided as a method or a computer program product. Therefore, the present invention may use a form of hardware only embodiments, software only embodiments, or embodiments with a combination of software and hardware. In addition, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing apparatus to generate a machine, so that the instructions executed by a computer or a processor of another programmable data processing apparatus generate an apparatus for implementing a specified function in one or more processes in the flowcharts and/or in one or more blocks in the block diagrams.

These computer program instructions may be stored in a computer readable memory that can instruct the computer or another programmable data processing apparatus to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing apparatus, so that a series of operations and steps are performed on the computer or the another programmable apparatus, thereby generating computer-implemented processing. Therefore, the instructions executed on the computer or the another programmable apparatus provide steps for implementing a specific function in one or more processes in the flowcharts and/or in one or more blocks in the block diagrams.

Although some preferred embodiments of the present invention have been described, a person skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope defined by the following claims and their equivalent technologies.

What is claimed is:

1. An apparatus, comprising:
a coherent coupler;
a first detector connected to the coherent coupler;
a second detector connected to the coherent coupler;
a first analog-to-digital converter (ADC) connected to the first detector, and a first processor connected to the first ADC, wherein the first ADC and the first processor are configured to implement carrier recovery; and
a second ADC connected to the second detector, and a second processor connected to the second ADC, wherein the second ADC and the second processor are configured to implement key recovery;
wherein the coherent coupler is configured to perform, based on a local oscillator optical signal, optical splitting processing and coherent coupling on a received transmit optical signal, to obtain a plurality of coherently coupled optical signals, wherein the received transmit optical signal comprises a reference optical signal and a quantum optical signal, the plurality of coherently coupled optical signals comprises at least one first coherently coupled optical signal and at least one second coherently coupled optical signal, each first coherently coupled optical signal comprises the reference optical signal, and each second coherently coupled optical signal comprises the quantum optical signal;
wherein the first detector is configured to:
perform optical-to-electrical conversion and amplification on the at least one first coherently coupled optical signal, to obtain a first electrical signal; and
transmit the first electrical signal to the first ADC;
wherein the second detector is configured to:
perform optical-to-electrical conversion and amplification on the at least one second coherently coupled optical signal, to obtain a second electrical signal, wherein an amplification factor corresponding to the at least one first coherently coupled optical signal is smaller than an amplification factor corresponding to the at least one second coherently coupled optical signal; and
transmit the second electrical signal to the second ADC;
wherein the first processor is configured to:
determine, according to the first electrical signal from the first ADC, phase frequency information between the local oscillator optical signal and the reference optical signal; and
send the phase frequency information to the second processor; and
wherein the second processor is configured to recover an original key from the second electrical signal based on the received phase frequency information.

2. The apparatus according to claim 1, further comprising:
a local oscillator connected to the first processor and the coherent coupler, wherein the local oscillator is configured to:
receive the phase frequency information sent by the first processor;
generate the local oscillator optical signal based on the received phase frequency information; and
send the local oscillator optical signal to the coherent coupler.

3. The apparatus according to claim 2, wherein:
the transmit optical signal is transmitted based on one polarization state, and the reference optical signal and the quantum optical signal are time division multiplexing signals;
the coherent coupler comprises a first optical splitter, a first coupler, and a second coupler, the first coupler and the second coupler are connected to the first optical splitter, the first coupler is connected to the first detector, and the second coupler is connected to the second detector;
the local oscillator is configured to:
split the local oscillator optical signal into two first local oscillator optical sub-signals, and respectively send the two first local oscillator optical sub-signals to the first coupler and the second coupler;
the first optical splitter is configured to:
receive the transmit optical signal;
perform optical splitting processing on the transmit optical signal to obtain two optically split optical signals; and
respectively input the two optically split optical signals to the first coupler and the second coupler;
the first coupler is configured to utilize one of the two received first local oscillator optical sub-signals to perform coherent coupling on one of the two received optically split optical signals, to obtain one of the plurality of coherently coupled optical signals; and
the second coupler is configured to utilize the other of the two received first local oscillator optical sub-signals to perform coherent coupling on the other of the two received optically split optical signals, to obtain another of the plurality of coherently coupled optical signals.

4. The apparatus according to claim 1, wherein:
the received transmit optical signal is transmitted based on one polarization state, and the reference optical signal and the quantum optical signal are time division multiplexing signals;
the coherent coupler comprises a third coupler, a second optical splitter, and a third optical splitter, the second optical splitter and the third optical splitter are connected to the third coupler, the second optical splitter is connected to the first detector and the second detector, and the third optical splitter is connected to the first detector and the second detector;
the third coupler is configured to:
utilize the local oscillator optical signal to perform coherent coupling on the received transmit optical signal;
split a third coherently coupled optical signal into two first coherent optical signals; and
respectively input the two first coherent optical signals to the second optical splitter and the third optical splitter;

the second optical splitter is configured to:
perform optical splitting processing on one of the two received first coherent optical signals, to obtain a first coherent optical signal that accounts for a first proportion in the first coherent optical signal and a first coherent optical signal that accounts for a second proportion in the first coherent optical signal, wherein a sum of the first proportion and the second proportion is 1; and
the third optical splitter is configured to perform optical splitting processing on the other of the two received first coherent optical signals, to obtain another first coherent optical signal that accounts for the first proportion in the first coherent optical signal and another first coherent optical signal that accounts for the second proportion in the first coherent optical signal;
wherein the two first coherent optical signals that each account for the first proportion in each first coherent optical signal are utilized as one of the plurality of coherently coupled optical signals, and the two first coherent optical signals that each account for the second proportion in each first coherent optical signal are utilized as another of the plurality of coherently coupled optical signals.

5. The apparatus according to claim 1, wherein the first ADC is configured to:
receive the first electrical signal;
perform sampling quantization on the first electrical signal to obtain a reference signal sampling sequence; and
send the reference signal sampling sequence to the first processor, wherein an electrical signal amplitude that is in a corresponding first electrical signal and that corresponds to the reference optical signal comprised in each first coherently coupled optical signal is in a first preset amplitude range of the first ADC; and
wherein the first processor is configured to:
determine the phase frequency information between the local oscillator optical signal and the reference optical signal based on the received reference signal sampling sequence, and send the phase frequency information to the second processor.

6. The apparatus according to claim 1, wherein the second ADC is configured to:
receive the second electrical signal;
perform sampling quantization on the second electrical signal to obtain a quantum signal sampling sequence; and
send the quantum signal sampling sequence to the second processor, wherein an electrical signal amplitude that is in a corresponding second electrical signal and that corresponds to the quantum optical signal comprised in each second coherently coupled optical signal is in a second preset amplitude range of the second ADC; and
wherein the second processor is configured to recover the original key based on the received quantum signal sampling sequence and the received phase frequency information.

7. The apparatus according to claim 1, further comprising a polarization controller connected to the coherent coupler, wherein the polarization controller is configured to:
receive the transmit optical signal, and adjust a polarization state of the received transmit optical signal to a fixed polarization state; and
send the transmit optical signal in the fixed polarization state to the coherent coupler.

8. A method, comprising:
performing, based on a local oscillator optical signal, optical splitting processing and coherent coupling on a received transmit optical signal, to obtain at plurality of coherently coupled optical signals, wherein the received transmit optical signal comprises a reference optical signal and a quantum optical signal, the plurality of coherently coupled optical signals comprises at least one first coherently coupled optical signal and at least one second coherently coupled optical signal, each first coherently coupled optical signal comprises the reference optical signal, and each second coherently coupled optical signal comprises the quantum optical signal;
performing optical-to-electrical conversion and amplification on the at least one first coherently coupled optical signal to obtain a first electrical signal;
performing optical-to-electrical conversion and amplification on the at least one second coherently coupled optical signal to obtain a second electrical signal, wherein an amplification factor corresponding to the at least one first coherently coupled optical signal is smaller than an amplification factor corresponding to the at least one second coherently coupled optical signal; and
determining, from the first electrical signal, phase frequency information between the local oscillator optical signal and the reference optical signal, and recovering an original key from the second electrical signal based on the received phase frequency information.

9. The method according to claim 8, wherein before performing the optical splitting processing and coherent coupling on the received transmit optical signal, to obtain the plurality of coherently coupled optical signals, the method further comprises:
generating the local oscillator optical signal based on the phase frequency information.

10. The method according to claim 9, wherein the received transmit optical signal is transmitted based on one polarization state, and the reference optical signal and the quantum optical signal are time division multiplexing signals; and
wherein performing, based on the local oscillator optical signal, optical splitting processing and coherent coupling on the received transmit optical signal to obtain the plurality of coherently coupled optical signals comprises:
receiving the transmit optical signal, and performing optical splitting processing on the transmit optical signal to obtain two optically split optical signals; and
splitting the local oscillator optical signal into two first local oscillator optical sub-signals, and utilizing the two first local oscillator optical sub-signals to respectively perform coherent coupling on the two optically split optical signals, so as to obtain the plurality of coherently coupled optical signals, wherein each first local oscillator optical sub-signal respectively corresponds to one of the optically split optical signals.

11. The method according to claim 9, wherein the received transmit optical signal is transmitted based on N polarization states, and N is an integer greater than 1; and
wherein performing, based on the local oscillator optical signal, optical splitting processing and coherent coupling on the received transmit optical signal to obtain the plurality of coherently coupled optical signals comprises:

splitting the received transmit optical signal into N optical signals through polarization optical splitting processing; and performing polarization rotation on at least (N−1) optical signals to output N initial optical signals in a same polarization state, wherein each initial optical signal respectively corresponds to one polarization state; and performing coherent coupling on each of the N initial optical signals based on the local oscillator optical signal, to output N coherently coupled optical signals.

12. The method according to claim 11, wherein the N initial optical signals comprise a plurality of initial optical signals that each comprise a reference optical signal and a quantum optical signal of time division multiplexing; or the N initial optical signals comprise at least any two of the following:

an initial optical signal that comprises a reference optical signal and a quantum optical signal of time division multiplexing, an initial optical signal that comprises the reference optical signal, or an initial optical signal that comprises the quantum optical signal.

13. The method according to claim 12, wherein performing coherent coupling on each of the N initial optical signals based on the local oscillator optical signal, to output the N coherently coupled optical signals, comprises:

when the N initial optical signals comprise a first initial optical signal that comprises the reference optical signal, utilizing a local oscillator optical signal that accounts for a third proportion in the local oscillator optical signal to perform coherent coupling on the first initial optical signal that comprises the reference optical signal, to obtain a coherently coupled optical signal that comprises the reference optical signal;

when the N initial optical signals comprise a second initial optical signal that comprises the quantum optical signal, utilizing a local oscillator optical signal that accounts for a fourth proportion in the local oscillator optical signal to perform coherent coupling on the second initial optical signal that comprises the quantum optical signal, to obtain a coherently coupled optical signal that comprises the quantum optical signal; or when the N initial optical signals comprise a third initial optical signal that comprises the reference optical signal and the quantum optical signal of time division multiplexing, utilizing a local oscillator optical signal that accounts for a fifth proportion in the local oscillator optical signal to perform coherent coupling and optical splitting processing on the third initial optical signal that comprises the reference optical signal and the quantum optical signal of time division multiplexing, to obtain two coherently coupled optical signals of the plurality of coherently coupled signals, wherein each of the obtained two coherently coupled optical signals of the plurality of coherently coupled signals comprises the reference optical signal and the quantum optical signal.

14. The method according to claim 13, wherein utilizing the local oscillator optical signal that accounts for the fifth proportion in the local oscillator optical signal to perform coherent coupling and optical splitting processing on the third initial optical signal that comprises the reference optical signal and the quantum optical signal of time division multiplexing, to obtain the two coherently coupled optical signals of the plurality of coherently coupled signals, comprises:

performing optical splitting processing on the third initial optical signal that comprises the reference optical signal and the quantum optical signal of time division multiplexing, to obtain two optically split initial optical signals;

splitting the local oscillator optical signal that accounts for the fifth proportion in the local oscillator optical signal into two second local oscillator optical sub-signals; and utilizing one of the two second local oscillator optical sub-signals to perform coherent coupling on one of the two optically split initial optical signals, and utilizing another of the two second local oscillator optical sub-signals to perform coherent coupling on another of the two optically split initial optical signals, to obtain the two coherently coupled optical signals of the plurality of coherently coupled signals.

15. The method according to claim 14, wherein utilizing the local oscillator optical signal that accounts for the fifth proportion in the local oscillator optical signal to perform coherent coupling and optical splitting processing on the third initial optical signal that comprises the reference optical signal and the quantum optical signal of time division multiplexing, to obtain the two coherently coupled optical signals of the plurality of coherently coupled signals, comprises:

utilizing the local oscillator optical signal that accounts for the fifth proportion in the local oscillator optical signal to perform coherent coupling on the third initial optical signal that comprises the reference optical signal and the quantum optical signal of time division multiplexing, and splitting a third coherently coupled optical signal into two second coherent optical signals; and performing optical splitting processing on each of the two second coherent optical signals to obtain two second coherent optical signals that each account for a sixth proportion in each second coherent optical signal and two second coherent optical signals that each account for a seventh proportion in each second coherent optical signal, wherein a sum of the sixth proportion and the seventh proportion is 1;

wherein the two second coherent optical signals that each account for the sixth proportion in each second coherent optical signal are utilized as one of the two coherently coupled optical signals of the plurality of coherently coupled optical signals, and the two second coherent optical signals that each account for the seventh proportion in each second coherent optical signal are utilized as another of the two coherently coupled optical signals of the plurality of coherently coupled optical signals.

16. The method according to claim 8, wherein the transmit optical signal is transmitted based on one polarization state, and the reference optical signal and the quantum optical signal are time division multiplexing signals; and wherein performing, based on the local oscillator optical signal, optical splitting processing and coherent coupling on the received transmit optical signal, to obtain the plurality of coherently coupled optical signals, comprises:

utilizing the local oscillator optical signal to perform coherent coupling on the received transmit optical signal, and splitting a third coherently coupled optical signal into two first coherent optical signals;

performing optical splitting processing on one of the two received first coherent optical signals, to obtain a first coherent optical signal that accounts for a first proportion in the first coherent optical signal and a first coherent optical signal that accounts for a second proportion in the first coherent optical signal, wherein a sum of the first proportion and the second proportion is 1; and performing optical splitting processing on the other of the two received first coherent optical signals, to obtain another first coherent optical signal that accounts for the first proportion in the first coherent optical signal and another first coherent optical signal that accounts for the second proportion in the first coherent optical signal;

wherein the two first coherent optical signals that each account for the first proportion in each first coherent optical signal are utilized as one of the two coherently coupled optical signals of the plurality of coherently coupled optical signals, and the two first coherent optical signals that each account for the second proportion in each first coherent optical signal are utilized as another of the two coherently coupled optical signals of the plurality of coherently coupled optical signals.

17. The method according to claim 8, wherein determining, from the first electrical signal, phase frequency information between the local oscillator optical signal and the reference optical signal comprises:

receiving the first electrical signal; and performing sampling quantization on the first electrical signal to obtain a reference signal sampling sequence, wherein an electrical signal amplitude that is in a corresponding first electrical signal and that corresponds to the reference optical signal comprised in each at least one first coherently coupled optical signal is in a first preset amplitude range; and determining the phase frequency information between the local oscillator optical signal and the reference optical signal based on the received reference signal sampling sequence.

18. The method according to claim 8, wherein recovering the original key from the second electrical signal based on the received phase frequency information comprises:

receiving the second electrical signal; and performing sampling quantization on the second electrical signal to obtain a quantum signal sampling sequence, wherein an electrical signal amplitude that is in a corresponding second electrical signal and that corresponds to the quantum optical signal comprised in each at least one second coherently coupled optical signal is in a second preset amplitude range; and recovering the original key based on the received quantum signal sampling sequence and the received phase frequency information.

19. The method according to claim 8, wherein before performing, based on a local oscillator optical signal, optical splitting processing and coherent coupling on the received transmit optical signal to obtain the plurality of coherently coupled optical signals, the method further comprises:

receiving the transmit optical signal, and adjusting a polarization state of the received transmit optical signal to a fixed polarization state.

* * * * *